United States Patent [19]
Mallen

[11] Patent Number: 5,474,043
[45] Date of Patent: Dec. 12, 1995

[54] HELICOTOROIDAL VANE ROTARY ENGINE

[75] Inventor: Brian D. Mallen, Charlottesville, Va.

[73] Assignee: Mallen Research Ltd. Partnership, Charlottesville, Va.

[21] Appl. No.: 262,055

[22] Filed: Jun. 17, 1994

[51] Int. Cl.[6] .................................................... F02B 53/00
[52] U.S. Cl. ........................ 123/241; 418/152; 418/165; 418/178; 418/195; 418/226
[58] Field of Search ............................ 123/241; 418/165, 418/195, 226

[56] References Cited

U.S. PATENT DOCUMENTS

| | | |
|---|---|---|
| 711,083 | 10/1902 | Taylor . |
| 926,731 | 7/1909 | Dowling . |
| 1,037,655 | 9/1912 | Peigler .................................. 418/226 |
| 1,102,742 | 7/1914 | Hauer . |
| 1,102,746 | 7/1914 | Hauer . |
| 1,269,937 | 6/1918 | Hutsell . |
| 1,304,497 | 5/1919 | Maxam . |
| 1,492,456 | 4/1924 | Hansen-Ellehammer . |
| 1,605,912 | 11/1926 | Barker . |
| 1,735,477 | 11/1929 | Stuart . |
| 1,914,091 | 6/1933 | Hamilton et al. . |
| 2,090,280 | 8/1937 | Biermann . |
| 2,091,577 | 8/1937 | Adler et al. ............................ 418/226 |
| 2,158,933 | 5/1939 | Good . |
| 2,374,445 | 4/1945 | McFarland . |
| 2,411,707 | 11/1946 | Biermann ............................... 418/195 |
| 2,435,476 | 2/1948 | Summers . |
| 2,500,143 | 3/1950 | Biermann ............................... 418/195 |
| 2,603,412 | 7/1952 | Chilton . |
| 2,716,861 | 9/1955 | Goodyear . |
| 2,974,603 | 3/1961 | Fraser . |
| 2,985,110 | 5/1961 | Burt et al. . |
| 3,180,271 | 4/1965 | Hartmann . |
| 3,221,665 | 12/1965 | Hartmann . |
| 3,407,742 | 10/1968 | Mitchell et al. . |
| 3,516,769 | 6/1970 | Korhonen . |
| 3,809,020 | 5/1974 | Takitani . |
| 3,810,722 | 5/1974 | Jeandel . |
| 3,820,515 | 6/1974 | Knisch . |
| 3,869,231 | 3/1975 | Adams . |
| 3,904,331 | 9/1975 | Rylewski ................................ 418/226 |
| 3,908,359 | 9/1975 | Jeandel . |
| 3,964,447 | 6/1976 | Normandin . |
| 4,008,013 | 2/1977 | Rylewski . |
| 4,021,165 | 5/1977 | Rylewski . |
| 4,075,981 | 2/1978 | Durst . |
| 4,184,813 | 1/1980 | Rylewski . |
| 4,230,088 | 10/1980 | Southard . |
| 4,274,814 | 6/1981 | Rylewski . |
| 4,355,965 | 10/1982 | Lowther . |
| 4,401,070 | 8/1983 | McCaan . |
| 4,638,776 | 1/1987 | Crittenden . |
| 5,277,158 | 1/1994 | Pangman . |

FOREIGN PATENT DOCUMENTS

9721  7/1910  United Kingdom ................. 418/226

Primary Examiner—Michael Koczo
Attorney, Agent, or Firm—Whitham, Curtis, Whitham & McGinn

[57] ABSTRACT

An internal combustion engine has a ring-shaped stator with a plurality of thin slits. A rotor, having a plurality of helicotoroidal troughs formed on its inner surface, encloses the stator. A planar vane wheel, having a plurality of radially extending vanes, is resident in each of the thin slits, with the vanes communicating with the respective helicotoroidal troughs. Rotation of the rotor imparts rotation to the vane wheels. The interaction of the stator, troughs, and vanes produces a plurality of sequential intake, compression, combustion, expansion, and exhaust chambers.

30 Claims, 20 Drawing Sheets

HELICOTOROIDAL VANE ROTARY ENGINE

BACKGROUND OF THE INVENTION

1. Field of the Invention

The present invention relates to a helicotoroidal vane internal combustion rotary engine for use in applications that utilize an internal combustion design. As discussed more fully below, the term "helicotoroidal vane" refers to the path that the vane follows on the inner surface of a rotor casing, as the vane rotates about an axis that is non-parallel to the axis of rotation of the rotor. The vanes, in effect, follow a "helix-around-a-torus" path within the rotor troughs. The term "toroidal" or "torus" refers to a ring shaped apparatus. Certain features of the present invention may be utilized in compressor designs as well.

More particularly, the invention relates to a helicotoroidal vane engine where air-fuel volumes are physically isolated through the compression/combustion/expansion cycle, as in a positive displacement engine, and the design is inertially balanced without any reciprocating members, as in a turbine engine.

2. Description of the Related Art

The overall invention relates to the class of devices known as internal combustion engines. Internal combustion engines produce mechanical power from the chemical energy contained in the fuel, this energy being released by burning or oxidizing the fuel internally, within the engine's structure.

Practical devices currently include piston engines, Wankel engines, reciprocating vane engines, and turbine engines. These current engine types may be broken down into two fundamental categories: positive displacement engines and turbine engines.

In a positive displacement engine the flow of the air-fuel mixture is segmented into distinct volumes that are completely or almost completely isolated by solid sealing elements throughout the combustion cycle, creating compression and expansion through physical volume changes within a chamber. Combustion in such a positive displacement arrangement is described as occurring at constant volume.

Turbine engines, however, rely on fluid effects to create compression and expansion, without solidly isolating chambers of the air-fuel mixture. Combustion in turbine engines is described as occurring at constant pressure. Although at a given compression ratio, the constant volume (positive displacement) ideal cycle is inherently more fuel-efficient than the constant pressure (turbine) ideal cycle, real world constraints set by current design shortcomings usually result in the opposite efficiency ranking order.

There are trade-offs associated with the selection of a particular engine design. For example, turbine engines suffer substantial efficiency losses at partial power settings, a drawback which has prevented their practical use in automobiles to date. On the other hand, the reciprocating motion of the positive displacement engine introduces inertial forces which invariably produce friction and mechanical stresses that must be countered by lubrication. Taken together, these reciprocation effects result in designs with low efficiency, high pollution emissions, and low power density (power to weight and power to size ratios). Thus, current embodiments of both turbine and positive displacement designs suffer shortcomings.

In seeking to eliminate the reciprocating motion from the positive displacement design, some engine designers have advocated the so-called "rotary" engine designs, such as the Wankel design or conventional vane engine design.

However, the Wankel and conventional vane engines are not true rotary engines in the sense implied, i.e., lacking the reciprocation of the piston engine. All of these rotary positive displacement devices fundamentally rely on reciprocation to generate volume changes. The reciprocation of these rotary engine designs may not be visually obvious at first as with the piston design, because the elements in the Wankel and vane designs combine the reciprocation with rotary motion, whereas the piston design separates the reciprocating motion of the piston from the rotary motion of the crankshaft. Combining the reciprocating and rotary motions, however, does not sidestep the inherent reciprocation shortcoming of current positive displacement designs.

If it were possible to extract the best potential aspects of the positive displacement and turbine engines, a design would emerge which would include, among others, the following features:

(1) Positive displacement design
(2) Zero reciprocating motion
(3) Fast combustion cycle
(4) High compression and expansion pressure ratios
(5) Lean fuel-air ratio
(6) Zero oil lubrication in engine chamber These features have certain advantages for engine designers. For example, a fast combustion cycle would reduce NOx pollution emissions. Furthermore, the high compression and expansion pressure ratios would allow lean fuel-air mixtures to be reliably ignited and reacted. This lean mixture would in turn keep peak gas temperatures down low enough to minimize NOx pollution emissions and permit the utilization of existing high temperature ceramic materials which could withstand the peak temperatures, thereby eliminating the need for an efficiency-robbing cooling system. The lack of reciprocating forces would further provide an acceptable low-stress environment to utilize the existing high-temperature ceramic materials.

In addition, the design would permit utilization of air-bearings, which would eliminate all liquid or solid lubricants from the combustion chamber, further reducing pollution emissions. The lack of oil lubrication would permit high-temperature, uncooled operation, which would enhance longevity and reliability.

The efficiency of such an engine would be optimized by the high compression and expansion ratios, the lack of an energy-robbing cooling system and the lean fuel-air ratio.

In addition to the stated factors which reduce the percentage of emissions, the increased thermal efficiency of such an engine would lower absolute levels of all pollutants for any given energy output. Even $CO_2$, a necessary by-product of hydrocarbon combustion, would decrease in absolute levels, simply by virtue of the increased thermal efficiency.

The combination of a positive displacement design without any reciprocating motion would allow fast combustion cycles at fast flow velocities, operating with all forces virtually perfectly balanced. This would result in an extremely high power density, thereby allowing the lean fuel-air ratios to be used while at the same time reducing weight. A reduction in weight would permit the use of smaller quantities of the advanced ceramic materials necessary for high temperature, uncooled operation-without incurring undue costs. Such a "Positive Displacement Turbine" engine would combine the partial power efficiency advantages of positive displacement engines with the high power density, balanced, and smooth-running design of turbine engines. Such a design would yield high fuel efficiency and low pollution emissions at all power settings.

Therefore, a need exists for an internal combustion engine that seeks to optimize certain performance characteristics of both the positive displacement and turbine engines.

SUMMARY OF THE INVENTION

Accordingly, the present invention is directed to a helicotoroidal vane rotary engine which embodies a design, substantially obviating one or more of the problems resulting from limitations and disadvantages of the related art. Specifically, the engine employs spinning vane wheels with radially protruding vanes that rotate about an axis non-parallel to the rotational axis of the rotor, allowing multiple, isolated volumes of air to speed past peak compression, ignite, and continue on to expansion, without having to pass through any ports or, by geometrical necessity, leave part of the air in the compression region, thus maintaining "constant mass" or "material volume" throughout the combustion cycle. The invention provides multiple combustion regions, which do not rely on rotor diameter changes to create volume changes, thereby balancing the radial loads on the vane wheels, and allowing for an increase in the compression and expansion ratios.

The invention also counters compression and combustion thrust loads placed on the vane wheels by porting air of a certain pressure from the stator surface to the central region of the vane wheels, and doing so in a way that establishes a self-governing thrust bearing.

In one embodiment, the invention eliminates gyroscopic forces on the spinning vanes by keeping the vane housing fixed and rotating the trough casing, and doing so in such a way that the intake and exhaust flows can be delivered without the need for any rotating seals.

To achieve these and other advantages and in accordance with the purpose of the invention, as embodied and broadly described herein, the invention is a helicotoroidal vane rotary engine comprising a toroidal-shaped stator disposed around a central axis, the stator having a plurality of radially and axially extending, annularly-spaced thin slits defining a plurality of stator segments; a rotor disposed for rotation about the central axis, the rotor defining an annular cavity enclosing the stator and having a plurality of helicotoroidal troughs formed on the inner surface of the cavity; at least one means extending from the stator through at least one opening in the rotor for fixedly supporting and securing the stator; a planar vane wheel disposed in each thin slit for rotation about the wheel axis, each vane wheel having a plurality of annularly-spaced vanes radially extending into respective helicotoroidal troughs on the inner surface of the rotor cavity such that rotation of the rotor about the central axis imparts rotation to the vane wheels about their respective wheel axes, the vanes, helicotoroidal troughs, and stator cooperating to define a plurality of sequential intake, compression, combustion, expansion and exhaust chambers as the rotor and vane wheels rotate about their respective axes; intake and exhaust ports disposed to selectively communicate with the chambers; and a fuel system disposed to selectively communicate with the chambers.

In another aspect, the present invention is a method for inserting vane wheels into a helicotoroidal vane rotary engine having a stator with a plurality of radially and axially extending, annularly-spaced, thin slits, and a rotor having at least one removable casing portion, the removable casing portion having an annular span less than the annular span between adjacent thin slits, the method comprising the steps of removing at least one casing portion of the rotor; inserting a vane wheel into an exposed thin slit in the stator; rotating the rotor to expose a second thin slit; inserting a vane wheel into the second thin slit; repeating the process until all thin slits are filled with the vane wheels, and replacing the casing portion of the rotor.

It is to be understood that both the foregoing general description and the following detailed description are exemplary and explanatory only and are not restrictive of the invention, as claimed. Additional features and advantages of the invention will be set forth in the description which follows, and in part will be apparent from the description, or may be learned by practice of the invention. The objectives and other advantages of the invention will be realized and attained by the apparatus and method particularly pointed out in the written description and claims hereof, as well as the appended drawings.

The accompanying drawings are included to provide a further understanding of the invention and are incorporated in and constitute a part of this specification, to illustrate the embodiments of the invention, and, together with the description, to serve to explain the principles of the invention. The drawings have been expanded and distorted to better illustrate the features of the invention, and are not necessarily representative of the exact dimensions of the engine.

Figure 14:
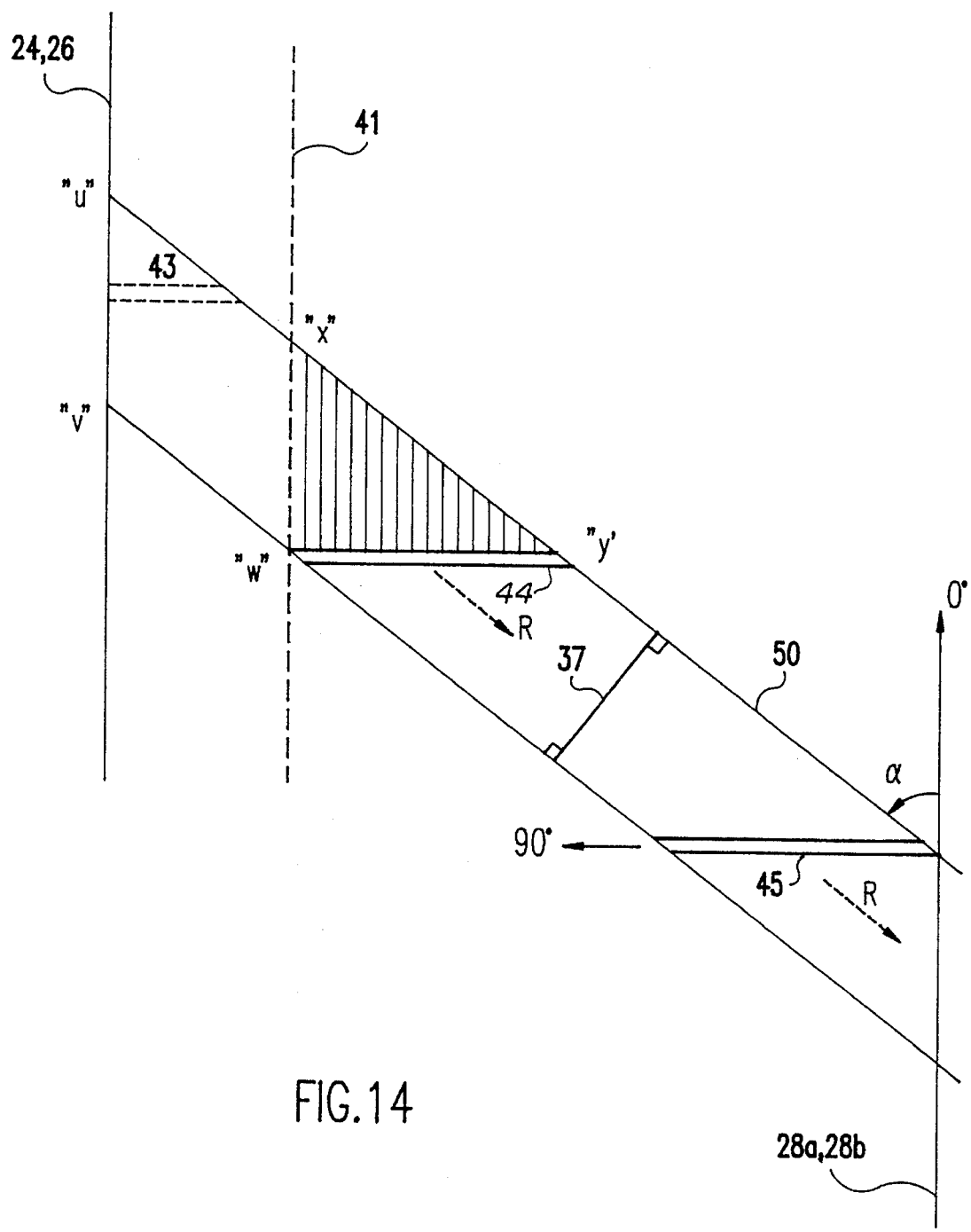

FIG. 14 is a top diagrammatic view of adjacent vanes on their respective vane wheels communicating with the trough casing.

Figure 15:
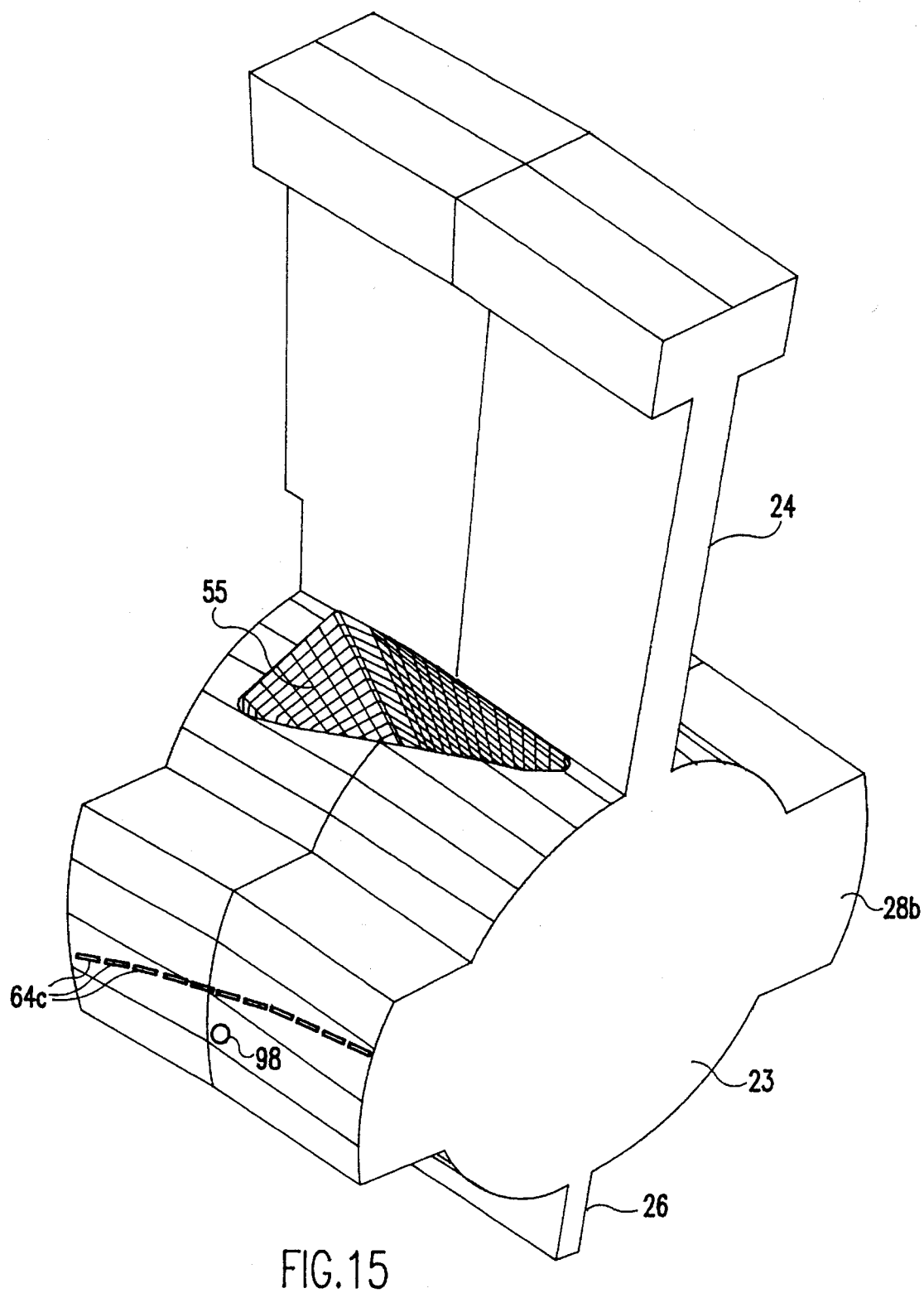

FIG. 15 is a perspective view of a stator segment illustrating a transfer passageway and fuel slits in a line corresponding to the trough.

Figure 5:
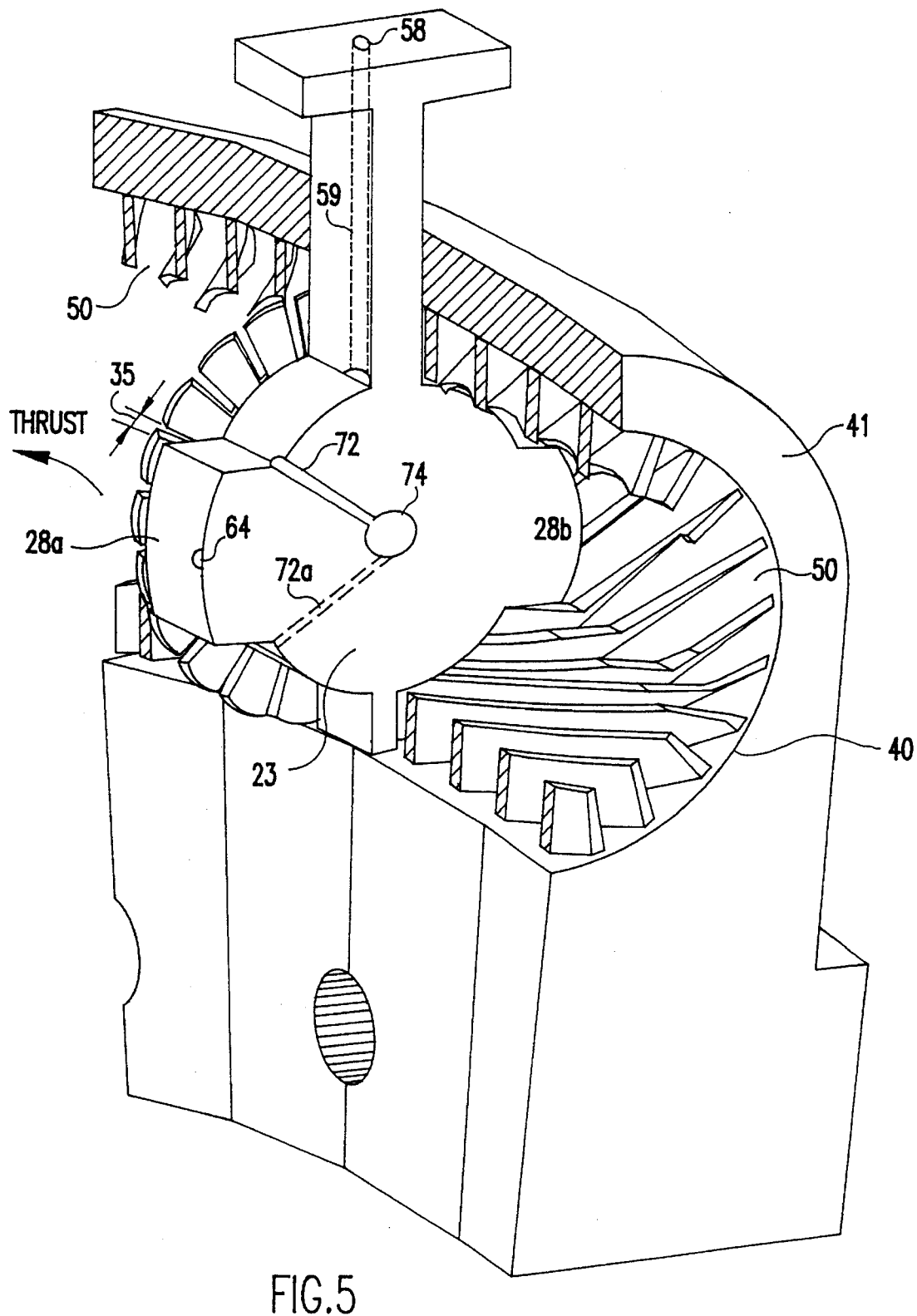
FIG. 5 is a composite perspective view illustrating the interaction of the trough casing, a stator segment, and a vane wheel, and further illustrating air and fuel ports in the stator.
Figure 16:
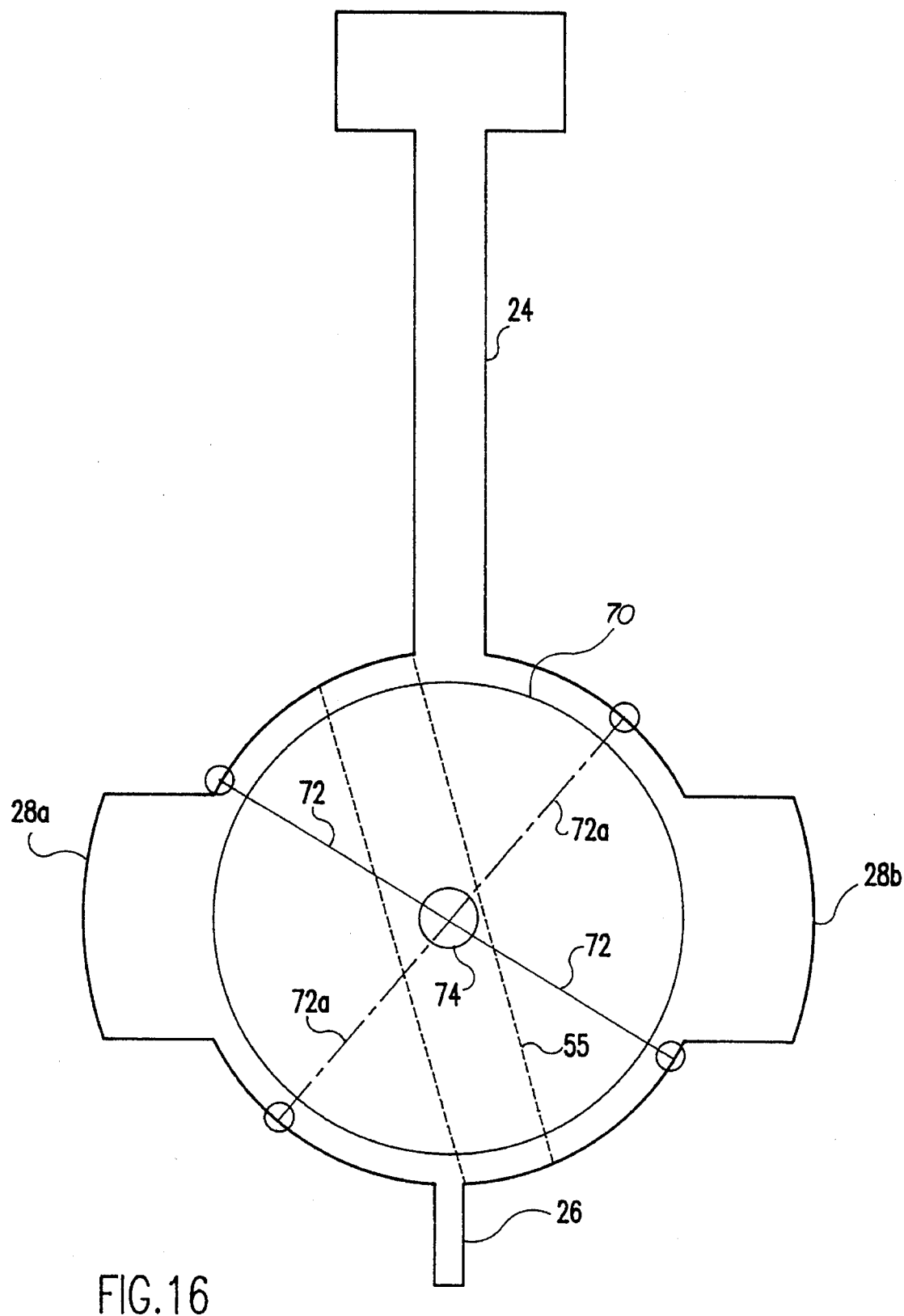

FIG. 16 is a front view of the stator segment of FIG. 5 illustrating the thrust bearing ducting through the stator.

Figure 17:
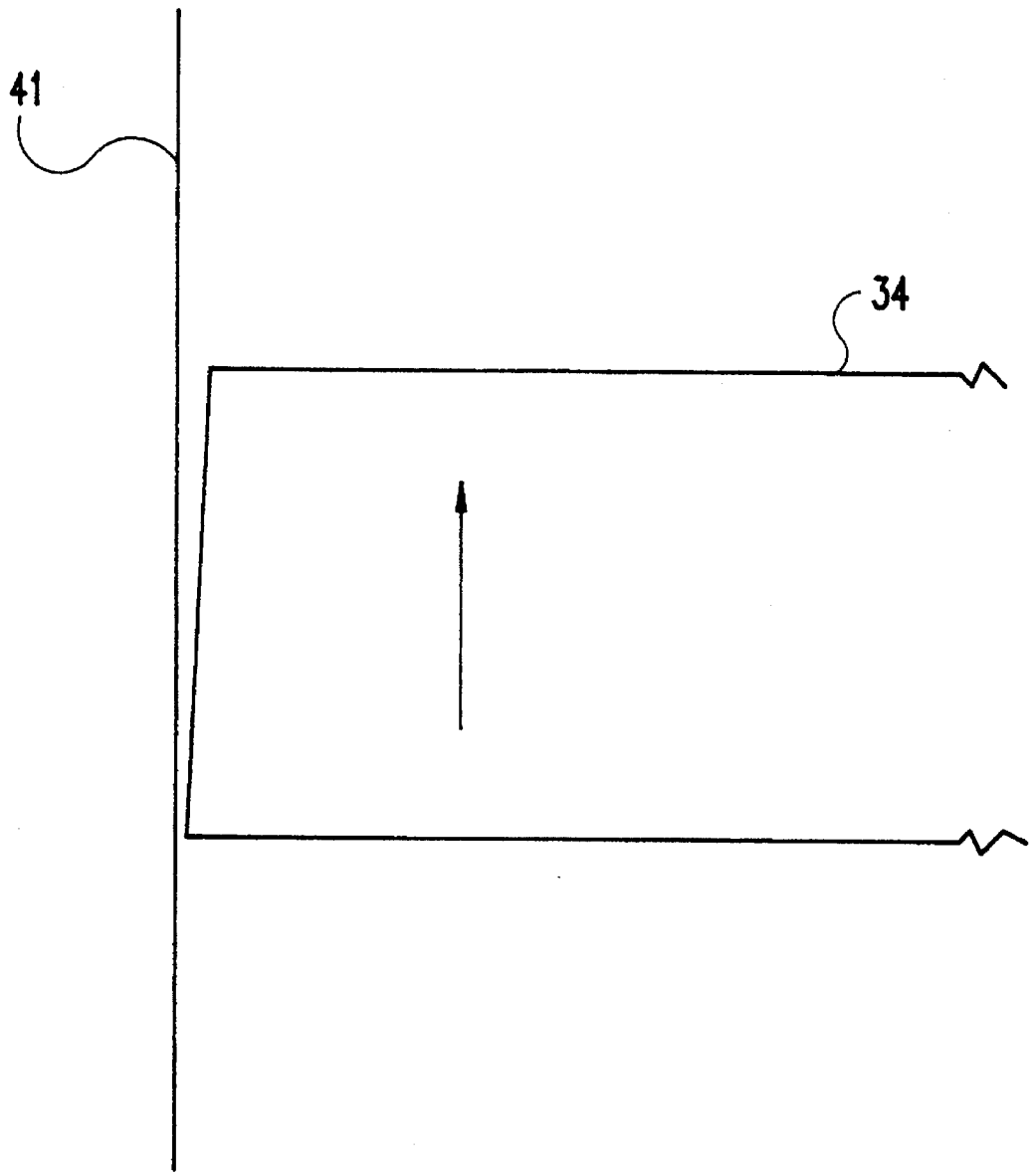

FIG. 17 is a diagrammatic representation of the interaction of the rotor surface and vane showing a tapered vane end.

Figure 18:
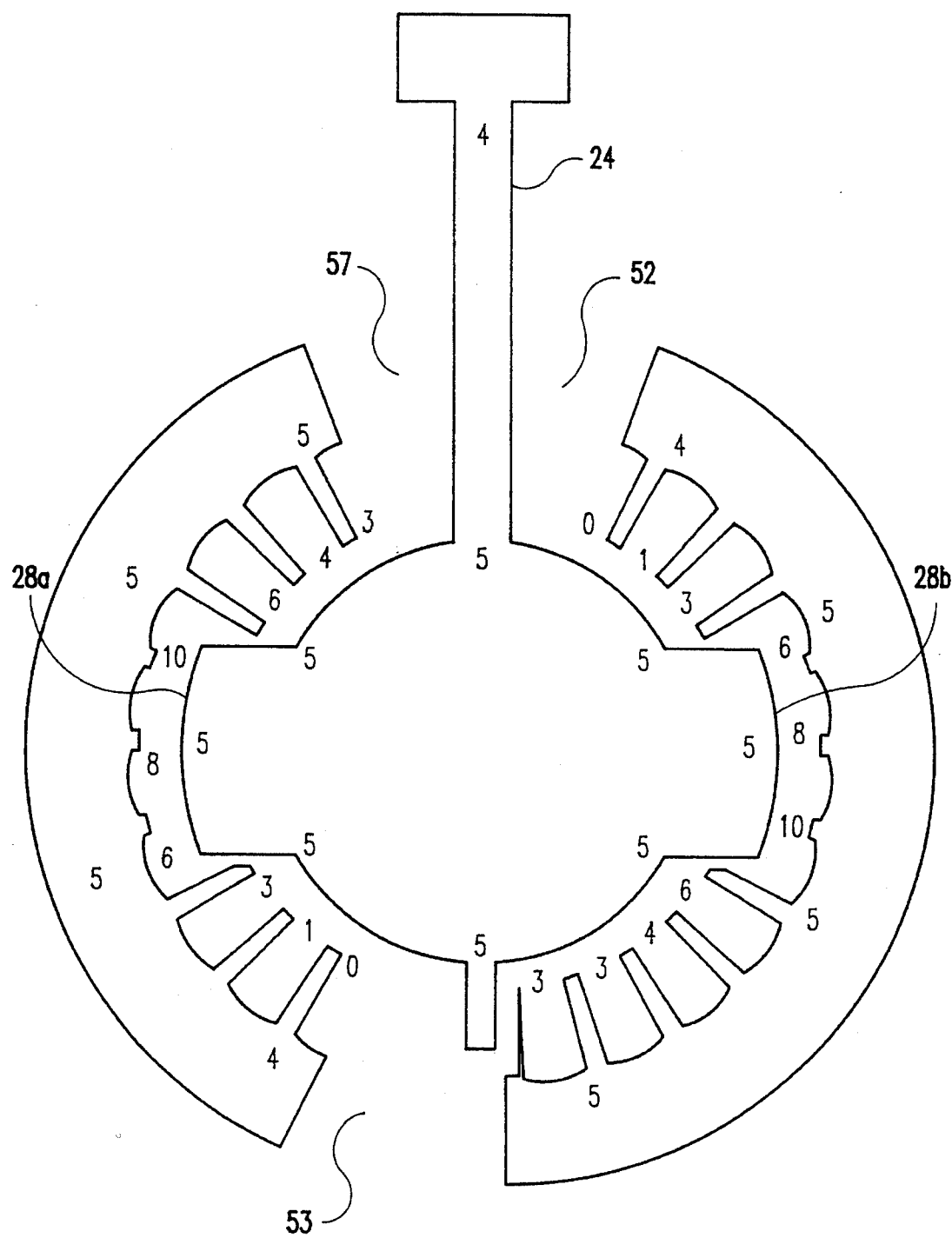

FIG. 18 is a diagrammatic representation of the interaction of the rotor and stator and a relative temperature distribution scale within.

Figure 19:
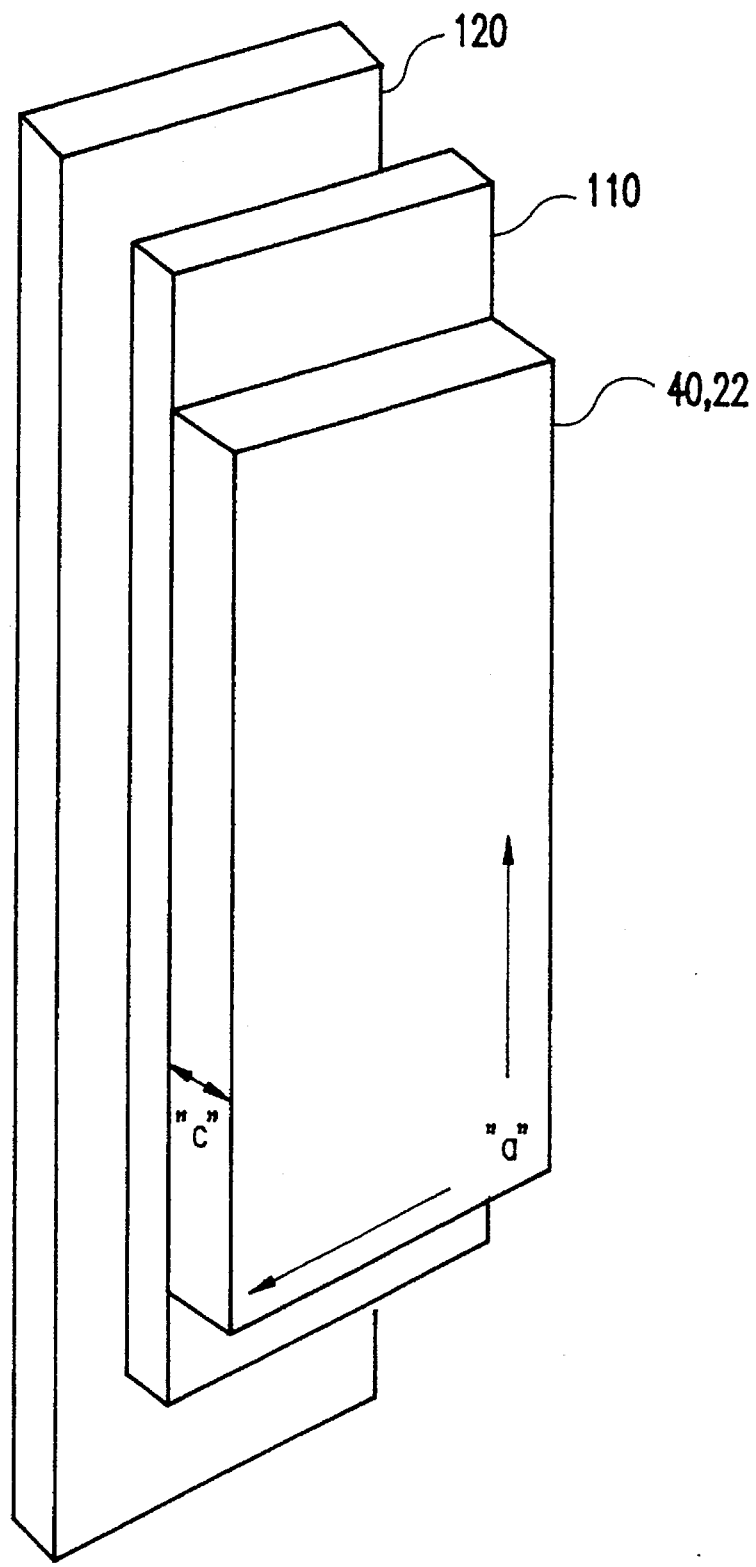

FIG. 19 is a diagrammatic representation of the surface coatings on the rotor and stator.

Figure 20:
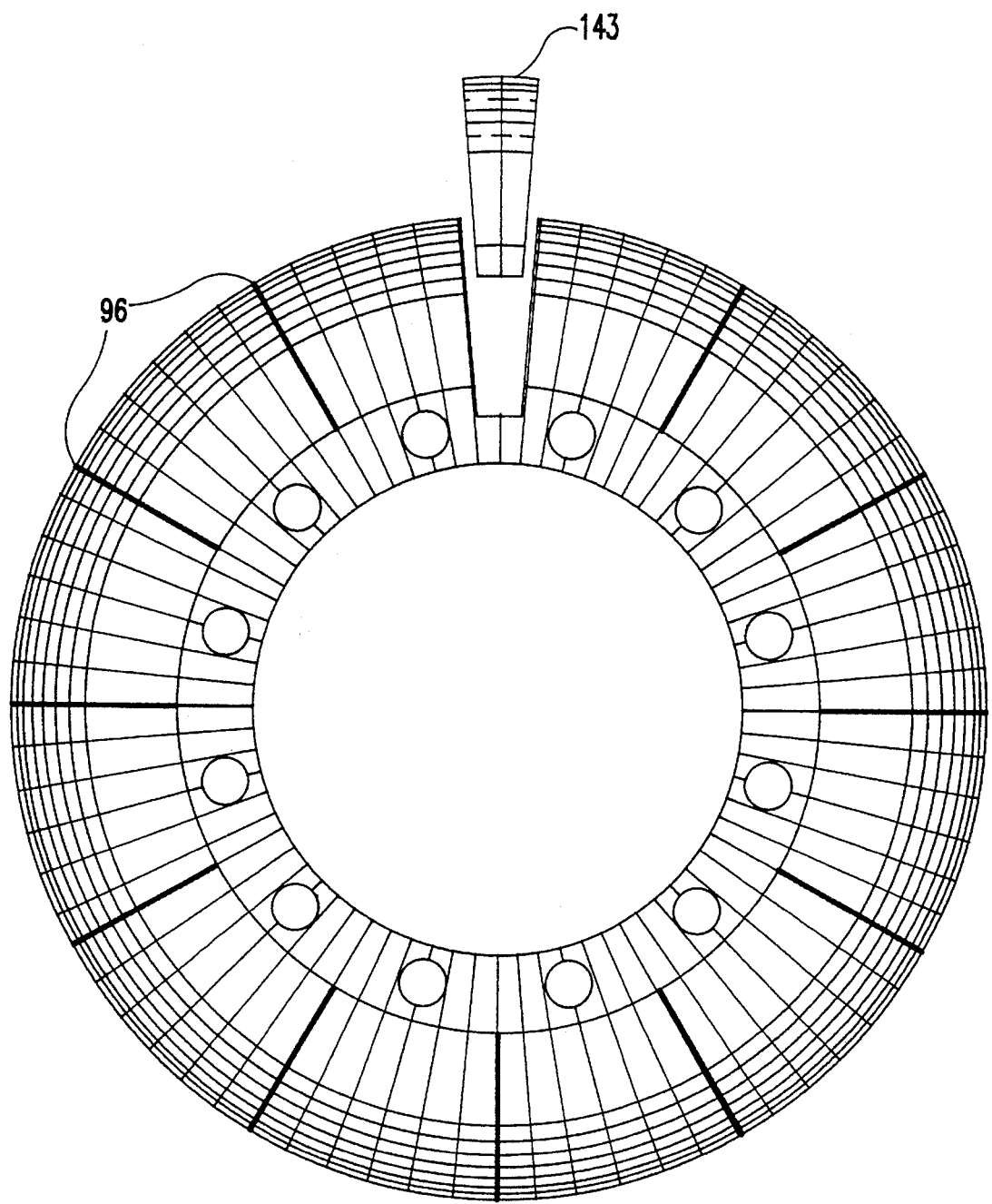

FIG. 20 is a diagrammatic representation of the rotor with one portion removed and illustrating the radial thermal expansion slits.

DETAILED DESCRIPTION OF THE INVENTION

Reference will now be made in detail to an embodiment of the invention, an example of which is illustrated in the accompanying drawings. Wherever possible, the same reference numbers will be used throughout the drawings to refer to the same or like parts.

According to the present invention, a helicotoroidal vane rotary internal combustion engine is provided to convert the chemical energy of the fuel to useful work. As noted above, the term "helicotoroidal vane" refers to the path that the vane follows on the inner surface of the rotor casing, as the vane wheel rotates about an axis that is non-parallel to the axis of rotation of the rotor.

Figure 1:
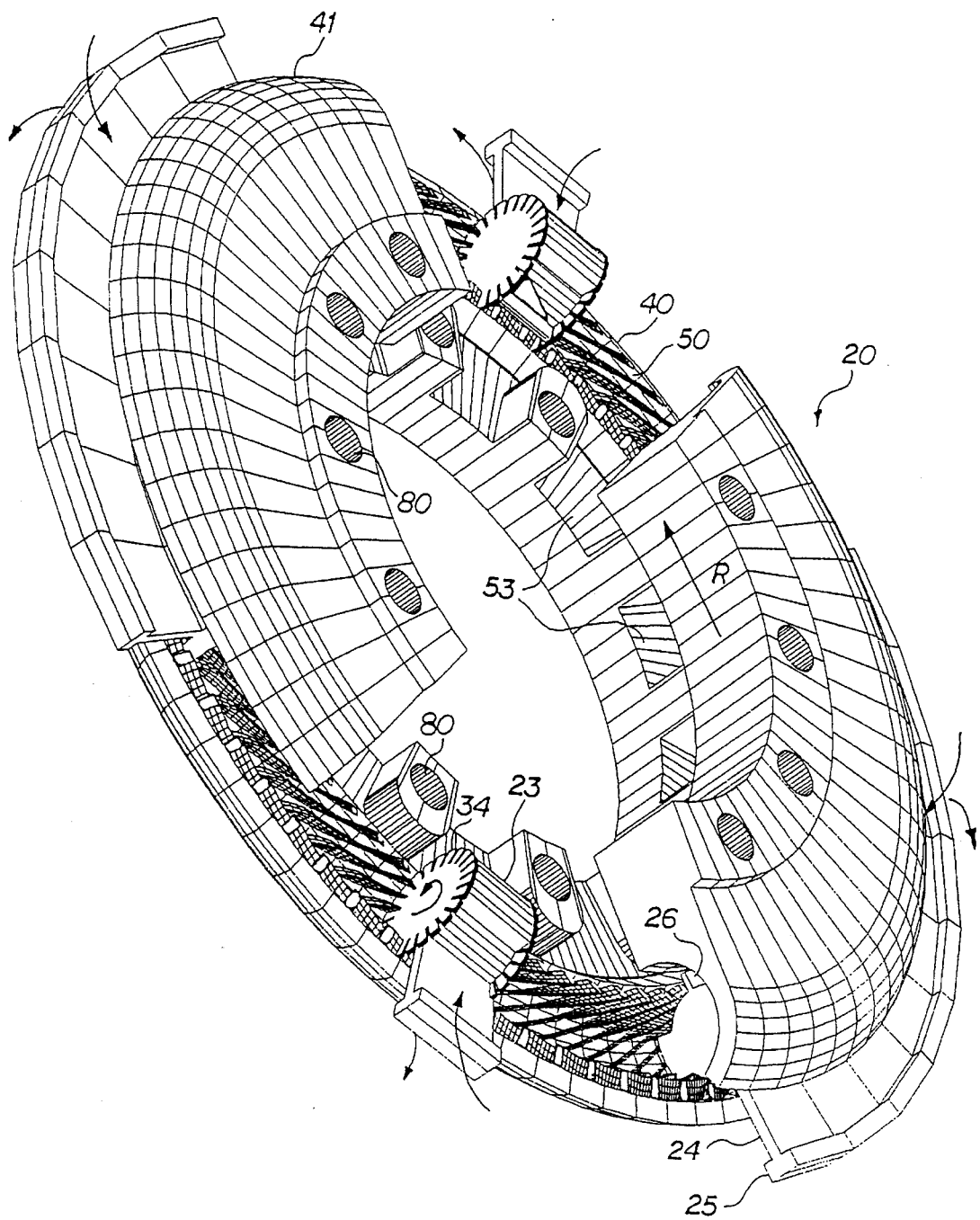
FIG. 1 is a cutaway perspective view of one embodiment of a helicotoroidal vane rotary engine, showing the helicotoroidal troughs, and exemplary stator segments and vane wheels.

An exemplary embodiment of the vane engine apparatus of the present invention is shown in FIG. 1 and is designated generally as reference numeral 20. As embodied herein and referring generally to FIGS. 1 and 2, the apparatus contains a toroidal-shaped stator having a plurality of thin slits, a rotor encircling the stator having helicotoroidal troughs formed on its inner surface, a plurality of vane wheels resident in the thin slits and communicating with the helicotoroidal troughs, defining a plurality of sequential, intake, compression, combustion, expansion, and exhaust chambers as the rotor rotates about the rotor axis and the vane wheels rotate about the vane wheel axis. The details of the system are described below.

Figure 2:
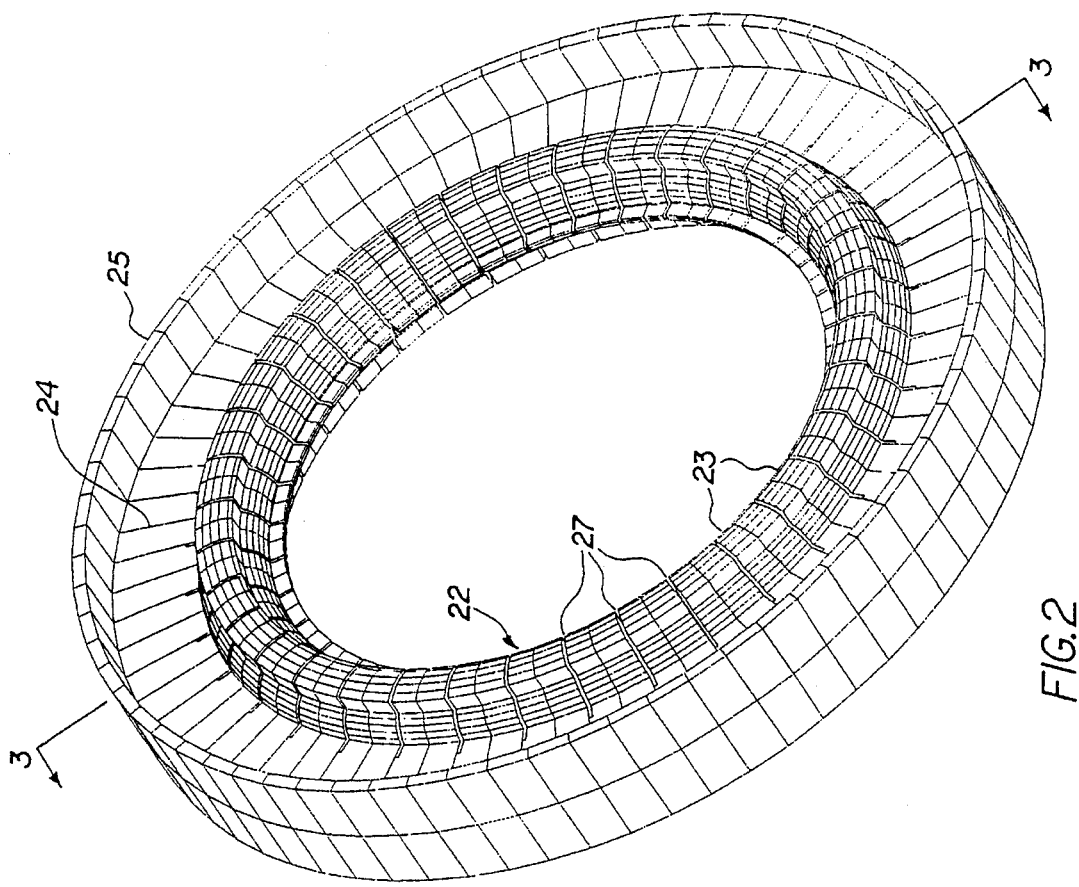
FIG. 2 is a perspective view of the toroidal shaped stator shown with the vane wheel slits.

The apparatus of the present invention 20, as shown in FIGS. 1 and 2, which has been expanded and distorted to better illustrate the features of the invention, includes a toroidal-shaped stator 22 disposed around a central axis comprising a plurality of annularly adjacent segments 23. The term "toroidal" in the context of this invention refers to a generally ring-shaped apparatus. The stator 22 is held fixed, by way of example and not by limitation, by a ring shaped ridge 24 disposed around the outer diameter of the stator 22. The ridge 24 provides structural integrity for the otherwise segmented stator as well as a means to secure the stator to a fixed reference point. In the embodiment shown in FIG. 2, an additional outer ring 25 is disposed around the ridge 24 to provide an alternate means of securing the stator to a fixed reference point.

Figure 3:
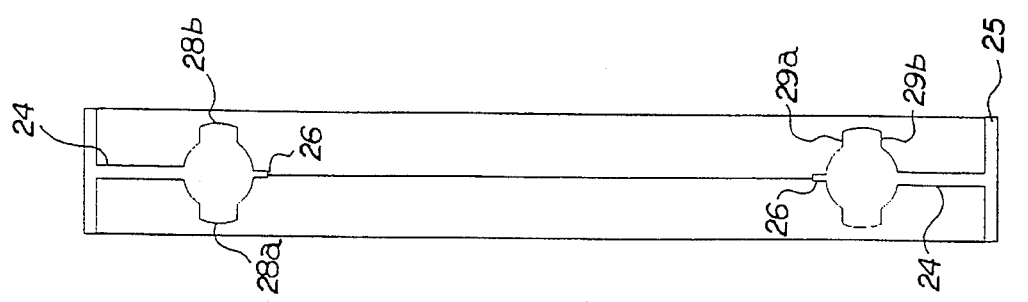
FIG. 3 is a cross-section of the toroidal shaped stator taken along the line 3—3 of FIG. 2.

Alternatively, as shown in FIGS. 2 and 3, the engine may be configured such that a second ridge 26 around the inner diameter of the stator, which can, but need not, be of comparable axial thickness to the outer diameter ridge, may also be used to provide structural integrity to the segmented stator, as well as provide a means to secure the stator to a fixed reference point. As can be appreciated by one of ordinary skill in the art, any number of means can be used to secure the stator in relation to a fixed reference point without departing from the spirit or scope of the invention. For example, the ridges 24 and 26 need not lie at inner and outer diameters nor be spaced apart at 180 degrees, there may be one or more ridges, or the ridges could be of various shapes or sizes.

Figure 4A:
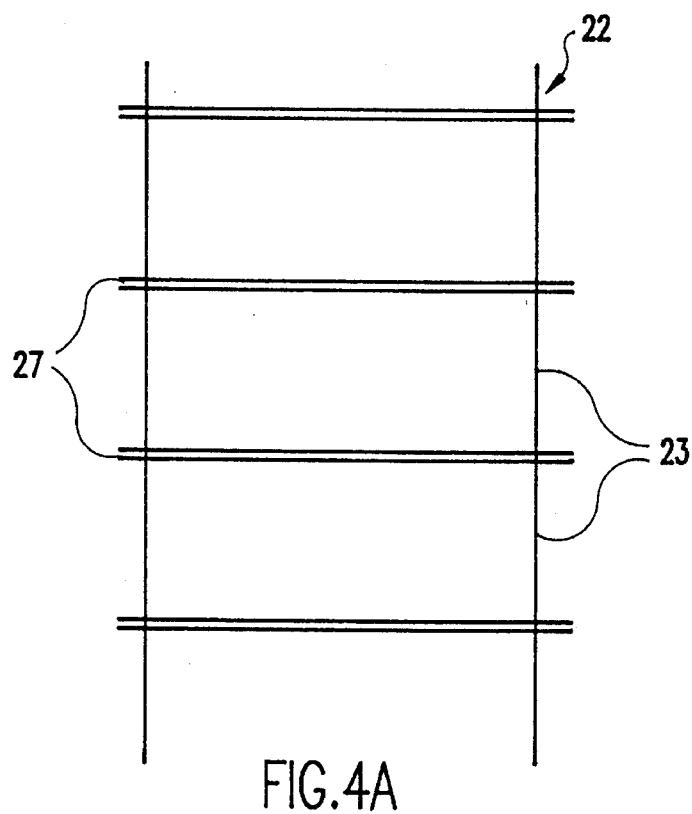
FIGS. 4a and 4b are top diagrammatic views of a portion of the stator with the thin slits shown.
Figure 4B:
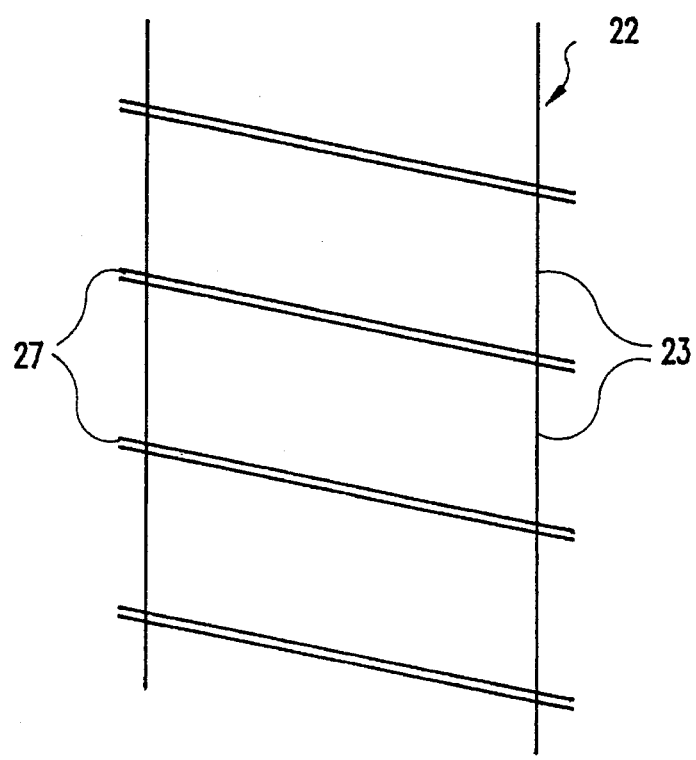

As best seen in FIG. 2, a plurality of radially and axially extending thin slits 27 are annularly spaced around the stator 22. FIG. 4a is an end view of one portion of the stator showing parallel and uniformly spaced thin slits around the stator. FIG. 4b is an alternate arrangement whereby the thin slits retain their parallel and uniform spacing but are oriented at an angle. The annular spacing, however, between the respective thin silts 27 in either of these embodiments need not be uniform.

As shown in FIGS. 3 and 5, the cross sectional shape of the stator 22 in this embodiment is not a true circle, but rather a circle with one or more protrusions (other than the outer and inner diameter ridges 24 and 26) around it. FIGS. 3 and 5 depict, by way of example and not limitation, two protrusions 28a and 28b at opposing locations 180 degrees apart, halfway between the inner and outer diameter ridges. At least one protrusion must be provided, and if there is more than one protrusion, they need not be spaced at opposing locations.

Figure 6:
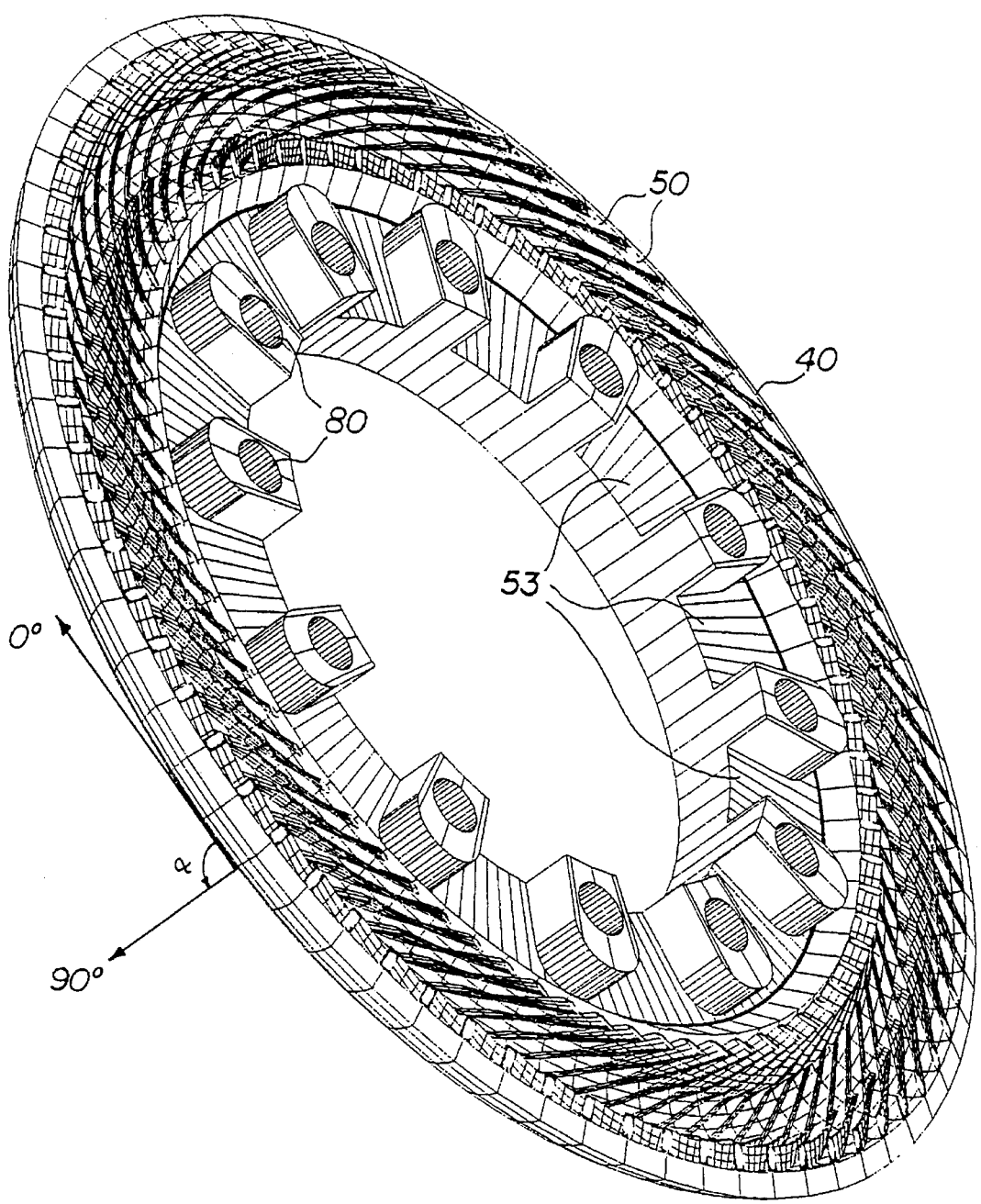
FIG. 6 is a perspective view of the inside surface of the rotor with the trough passages shown.

FIG. 5 is a cutaway perspective view of the annular rotor cavity 40 enclosing the stator showing a plurality of helicotoroidal troughs 50 formed on the inner surface of the rotor cavity. See also FIG. 6, which is a perspective view of the inner rotor cavity also showing the troughs 50. As best seen in FIG. 5, the trough heights are formed so as to approximate the shape of the stator cross section. The troughs 50 are also oriented at a helix angle $\alpha$ as shown in FIG. 6. Referring to the angular orientation shown in FIG. 6, a helix angle $\alpha$ of 0 degrees, for example, would result in adjacent "ring-shaped" troughs on the inner surface of the rotor cavity, while a helix angle $\alpha$ of 90 degrees would produce a plurality of radial troughs.

The helicotoroidal troughs 50 may be manufactured by a several methods including destructive-mold casting, electro-discharge machining, modified hobbing-lathe machining, and selective laser sintering.

The helix angle $\alpha$ necessarily changes from the maximum trough radius height at the outer ridges, see FIG. 5, to the minimum trough radius height at the inner protrusions due to changes in the diameter ratio of the trough to vanes at those points. The local helix angle will be determined by the diameter ratio of trough to vane, and the rotational velocity ratio of vane wheel to rotor casing, at the point of minimum separation between a specific vane and the trough casing.

The ratio of outer trough diameter to inner trough diameter will be set to provide a helix angle deviation within tolerable dimensions for proper operation. Too high of a deviation angle may result in unbalanced radial forces around the vane wheels due to larger combustion and expansion forces at one protrusion than the other. A high helix deviation angle may also cause trough arm thicknesses which are too small at the inner diameter/high helix angle region.

As shown in FIG. 5, the rotor casing 41 should have at least one opening to allow the outer diameter ridge 24 or inner diameter ridge 26 from the stator to extend through the rotor so that the stator can be secure and supported. Although the rotor casing 41 may be of one-piece configuration, it can also be composed of two or more rotor casing sections that are fastened together, so long as there is at least one opening to allow the stator ridge to pass through. The rotor casing sections can be secured by bolts 81 through bolt holes 80, see FIGS. 1, 6, and 12b, or other suitable means, at a location inside the inner diameter of stator 22. Alternatively, if the stator 22 is held fixed by its inner diameter 26, the rotor casing halves would be secured at a location outside the outer diameter of stator 22.

In an alternate embodiment, it is apparent that the rotating and stationary bodies can be reversed such that the toroidal shaped 'rotor' is rotatable within the 'stator' cavity. In this embodiment, the ridges extending from the rotor and through the stator can act as both a rotating and power transferring means for the engine.

Figure 7A:
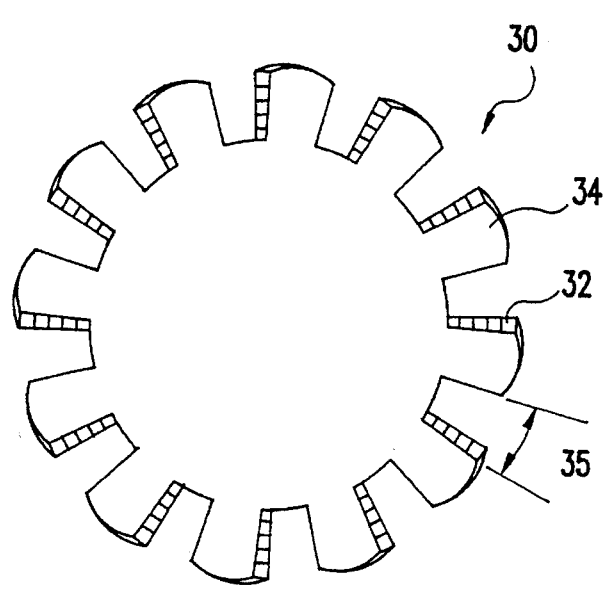
FIGS. 7a and 7b depict a 12-vane vane wheel embodiment, with a 50% vane-gap ratio.
Figure 7B:
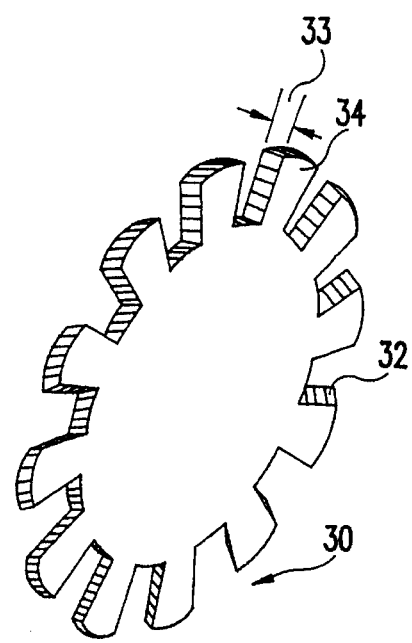
Figure 8:
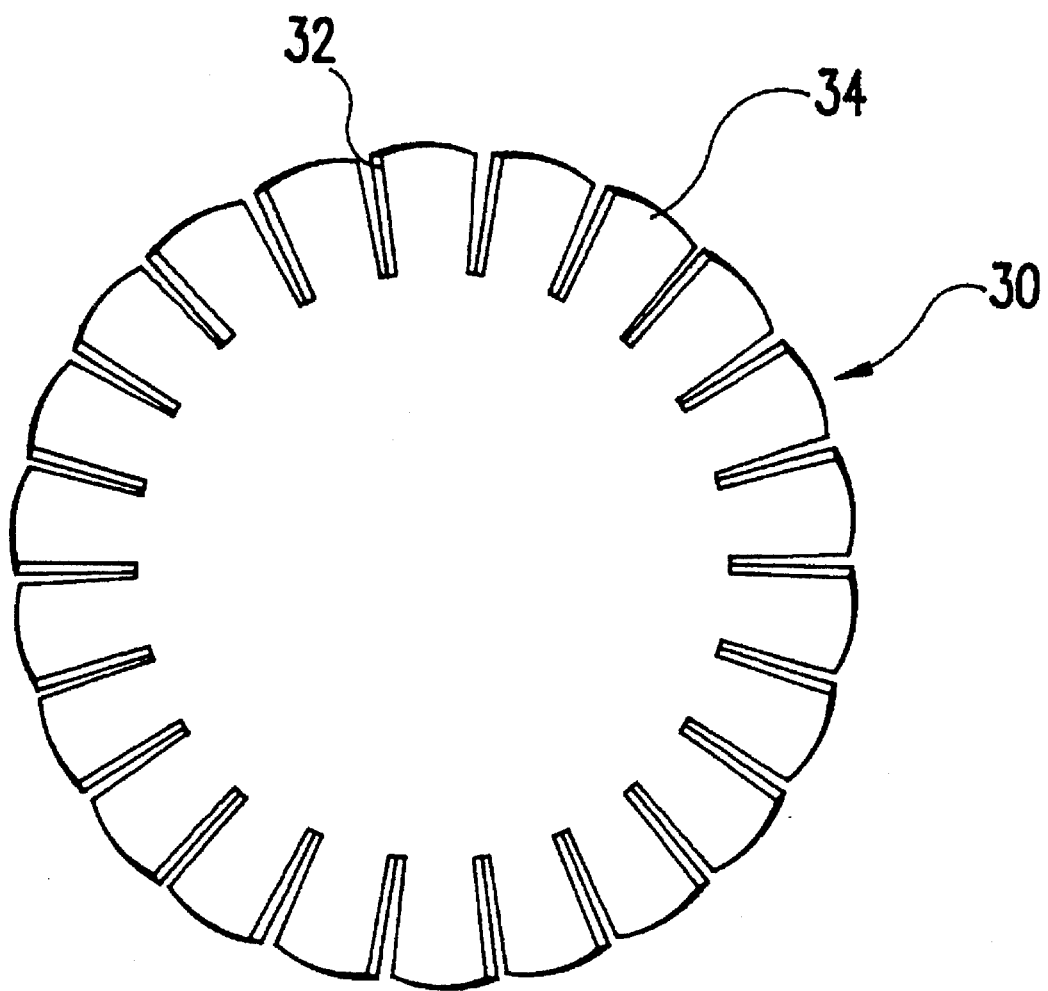
FIG. 8 depicts a 24-vane vane wheel embodiment with 75% vane-gap ratio.

Each planar vane wheel 30, as best seen in FIGS. 7a, 7b, and 8, has a plurality of annularly-spaced vanes 34 extending radially therefrom. The spacing between the respective vanes is exaggerated and distorted for illustrative purposes. FIGS. 7a and 8 do not imply limits, as to either the number of vanes or the vane-gap ratio. For example, FIG. 7a shows a 12-vane wheel embodiment, with a 50% vane-gap ratio, and FIG. 8 shows a 24-vane vane wheel embodiment with 75% vane-gap ratio. The ultimate configuration will depend on the engine design and desired performance characteristics.

The vane wheels may be manufactured by standard methods known in the art. For example, the vane wheels may be formed by extrusion, wherein the vane wheel is rotated during the extrusion process, producing a vane whose sides 32 are angled as shown in FIG. 7b. The extrusion rotation angle would be approximately equal to the average helix angle α of the troughs 50. Alternatively, the vane wheels may be formed by standard machining, molding, or Electro-Discharge Machining methods known in the art. While one piece construction of the vane wheel is desirable, it is not essential.

Figure 9:
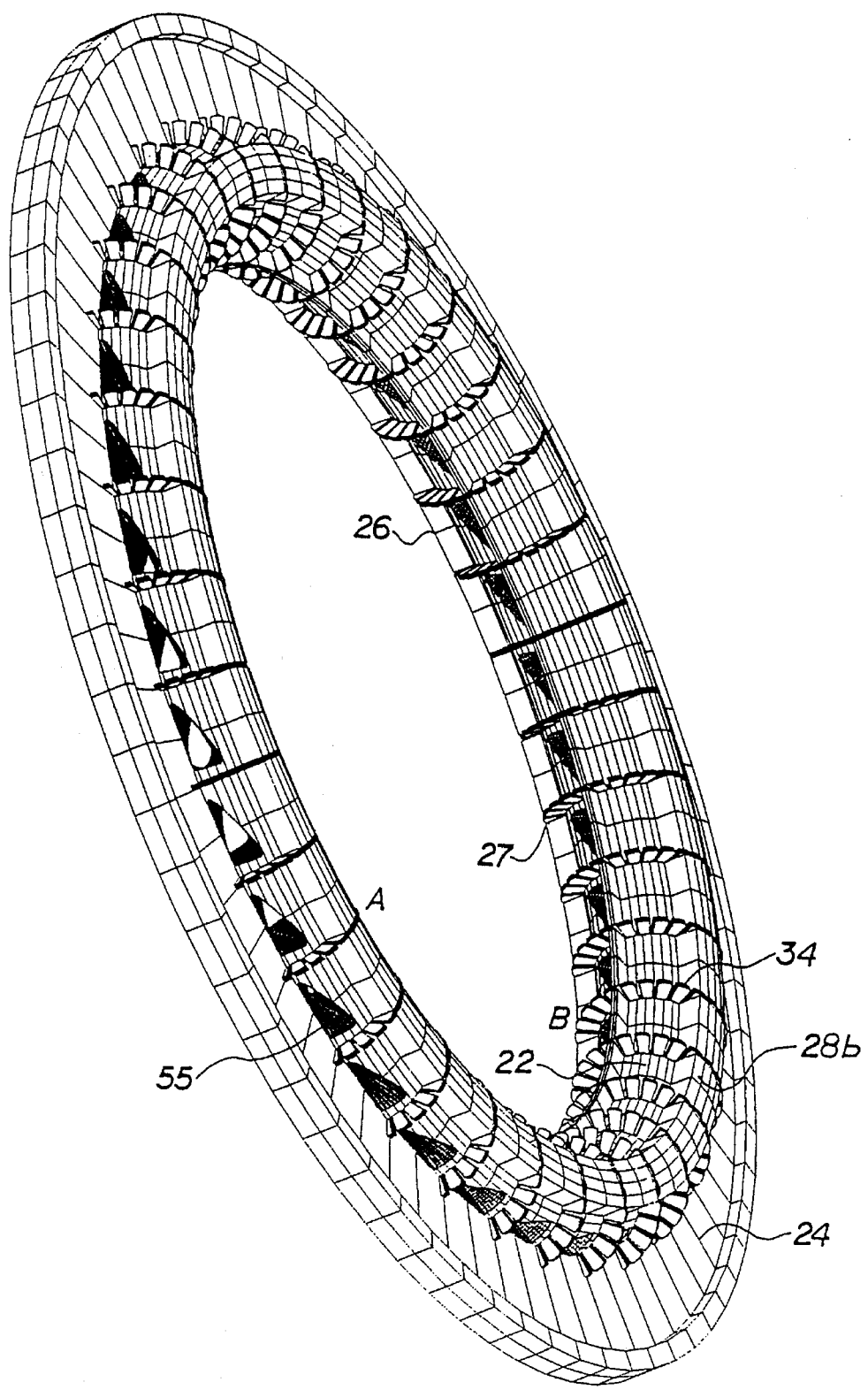
FIG. 9 is a composite perspective view showing vane wheels disposed in the thin slits around the toroidal stator.
Figure 10:
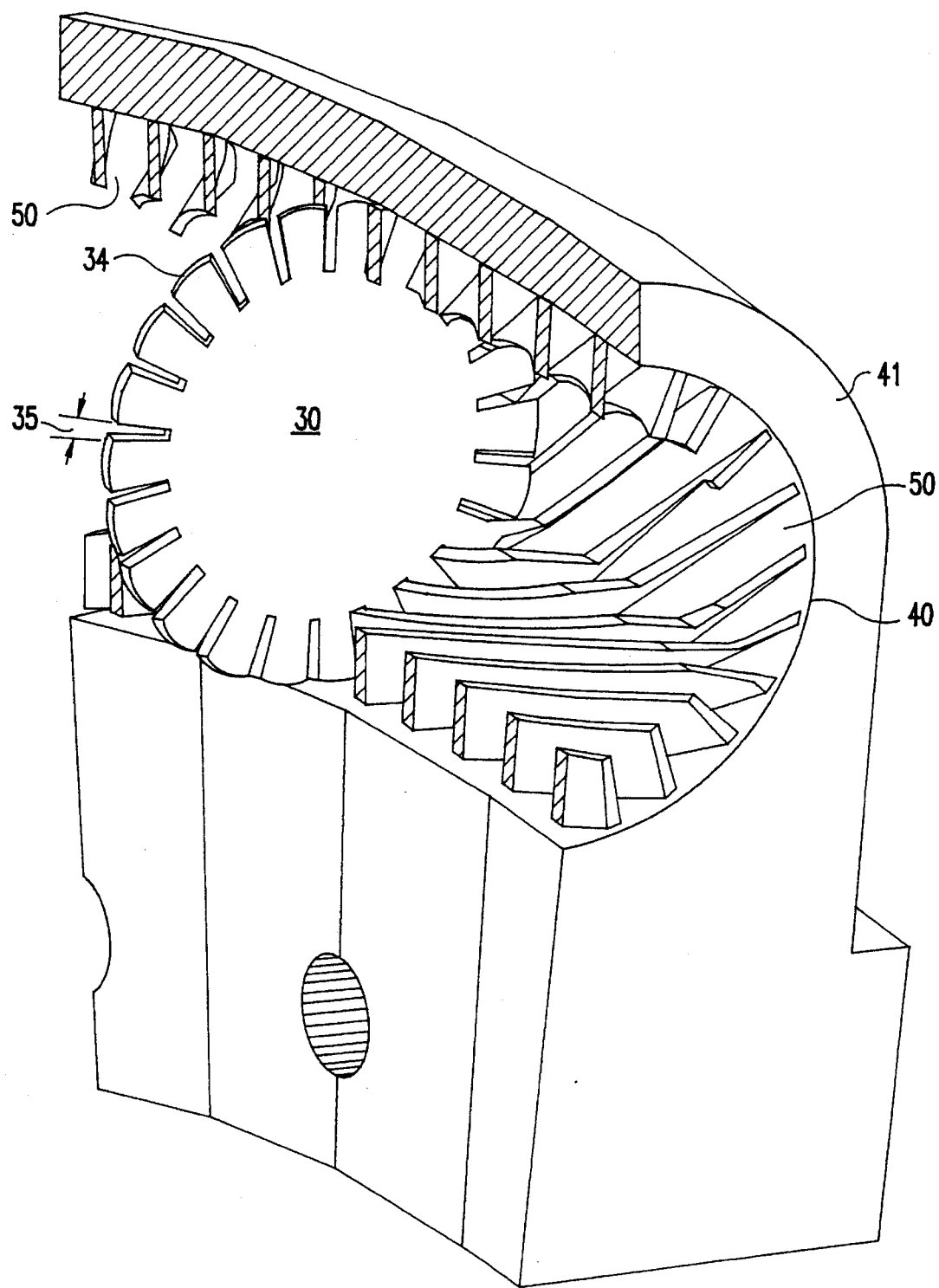
FIG. 10 is a composite perspective view illustrating the interaction of the trough casing and vane wheel.

As shown in FIG. 9, each vane wheel 30 sits freely in a thin slit 27. The radially extending vanes 34 communicate with the respective troughs 50 on the inner surface of the rotor cavity as shown in FIG. 10. The vane wheels are kept in place by their interaction with the helicotoroidal troughs. The length of the vanes 34 is approximately equal to the length of the stator protrusions. Alternatively, as shown in the embodiment in FIG. 9, the vanes 34 are of sufficient length so that the tips extend slightly beyond the protrusion 28b. This allows the vanes to maintain a seal with the trough casing as the vanes pass through minimum volume.

In operation, each vane wheel 30 rotates at a fixed ratio of the overall vane wheel rotational velocity to rotor casing rotational velocity, with the vane wheels 30 rotating about an axis that is not parallel to the rotational axis of the rotor. For example, FIG. 1 illustrates the direction of rotation "R" of the rotor and the corresponding rotational direction of the vane wheels. As the rotor casing rotates with respect to the stator, the revolving vanes communicate with the trough paths formed in the rotator casing. See FIG. 10. The rotor's rotation in relation to the stator automatically imposes rotation on the vane wheels, through the vane wheels' interaction with the helicotoroidal troughs. Thus, no gears or linkages are needed within this design, since all proper motions are automatically maintained. The rotation of the vane wheels and rotor casing causes the air flow to follow a path in one direction around the cross-sectional circumference of the stator toroid. See FIGS. 11a and 11b. The path is essentially a "helix-around-a-torus" or helicotoroidal path within the rotor troughs.

Figure 11A:
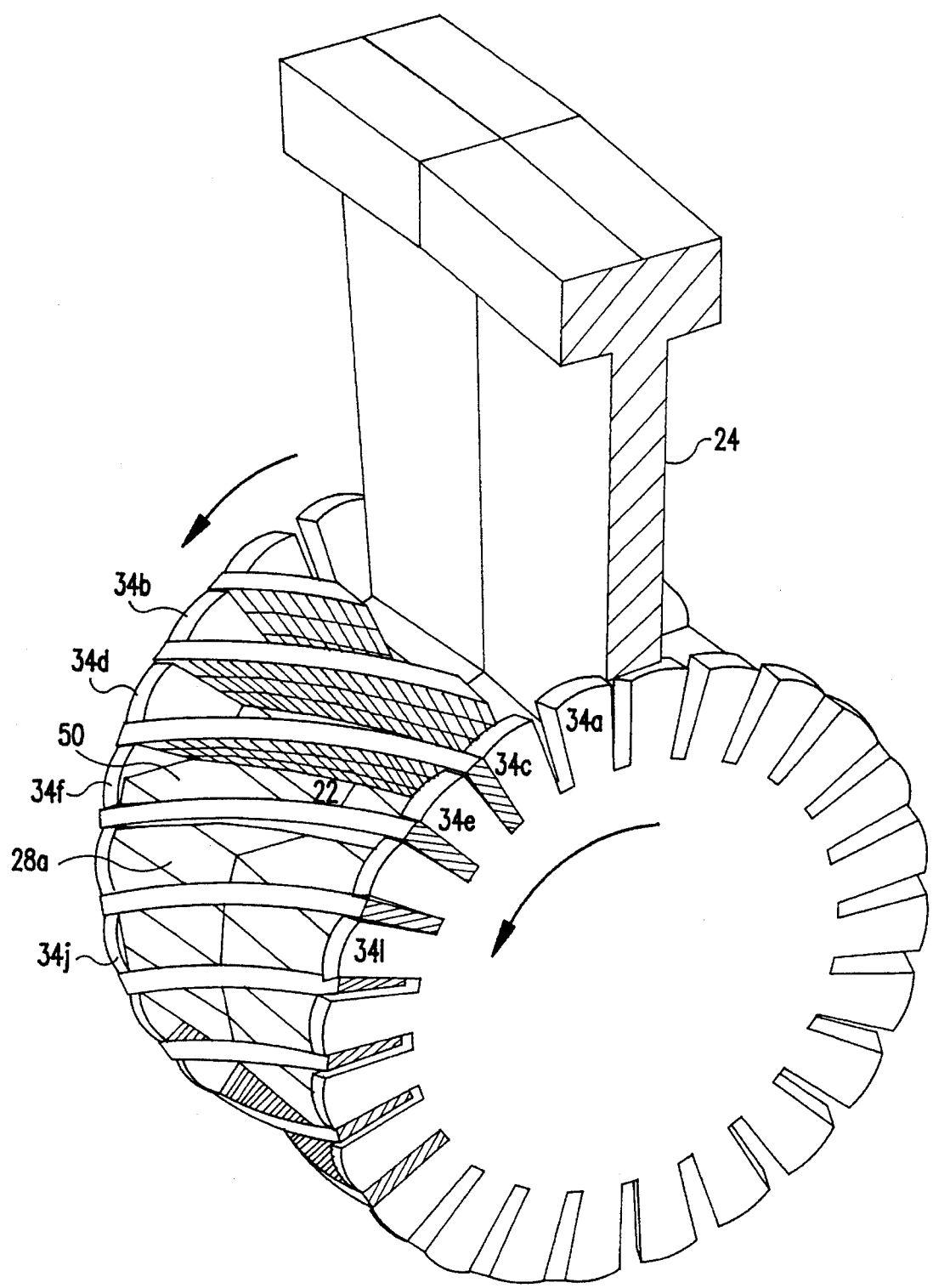
FIG. 11a is a perspective view of the interaction of the vanes, troughs, and stator, for the intake, compression, and combustion phases of the engine cycle.

As the vanes 34 rotate and communicate with the stator 22 and the troughs 50 around the 360 degree helicotoroidal path, isolated volumes of air are created, for example, between adjacent vanes, 34e and 34f, see FIG. 11a, the trough surrounding the ends of the vanes 50, and the toroidal stator 22 which seals against the edges of the trough. These isolated volumes or chambers would not occur between adjacent vanes where the adjacent vanes revolve past the inner and outer diameter ridges 24 and 26, as the air flow would be obstructed at that point.

Specifically, as shown in FIG. 11a, these isolated volumes pass through maximum volume when, for example, adjacent vanes 34c and 34d, on their respective vane wheels, are maximally extended past the toroidal stator 22 and minimum volume when adjacent vanes 34i and 34j are almost fully retracted into the toroidal stator protrusions 28a or 28b.

It is the combination of the stator cross-sectional shape and vane wheel alignment that produces a trapped volume of air with the rotor trough and stator, producing the compression and expansion cycles. In this embodiment, two complete engine cycles of intake, compression, ignition, expansion, and exhaust are formed by each pair of adjacent vanes for every complete revolution of the vane wheel.

Figure 11B:
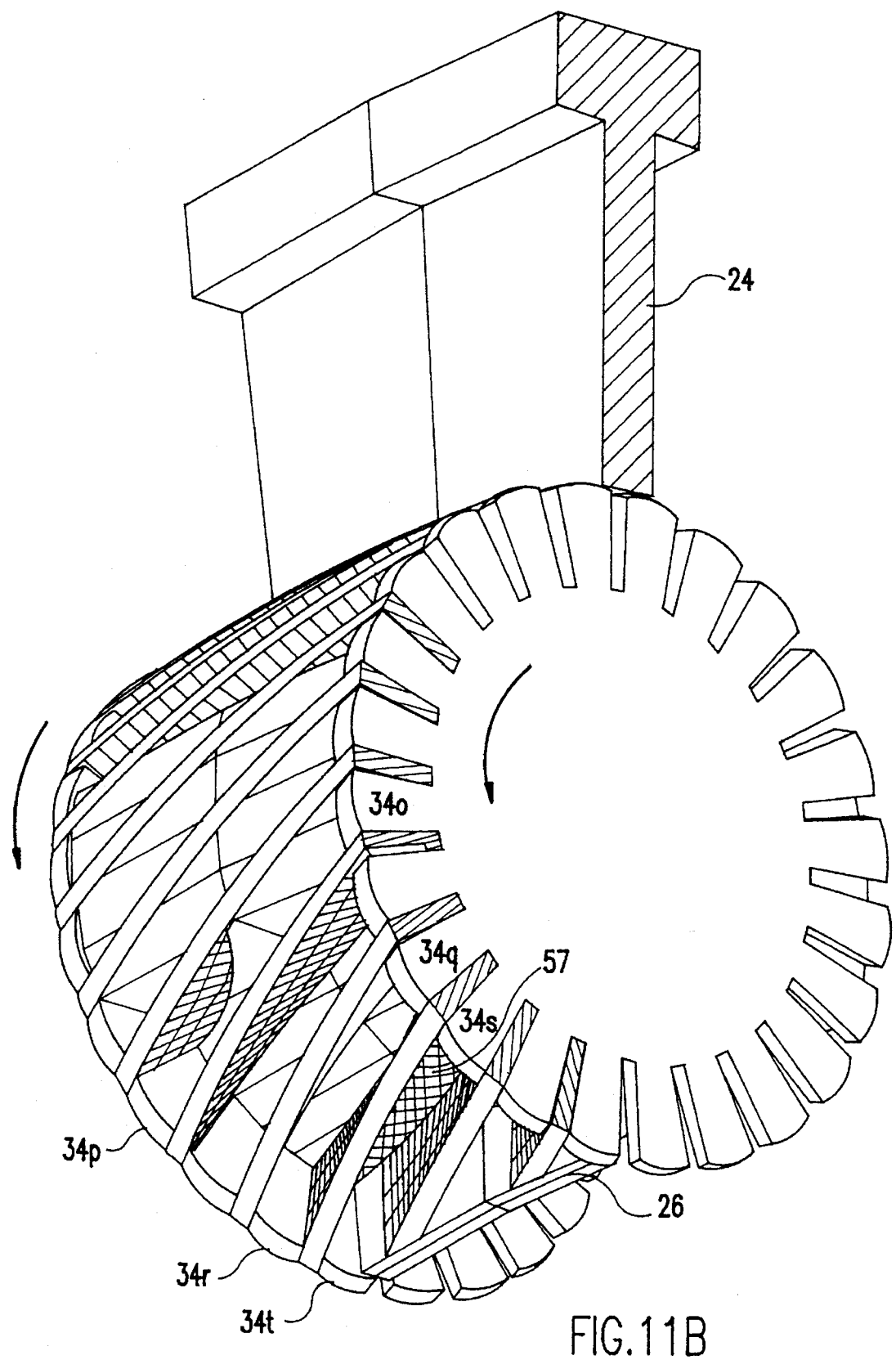
FIG. 11b is a perspective view of the interaction of the vanes, troughs, and stator, for the combustion, expansion and exhaust phases of the engine cycle.

Referring to FIGS. 11a and 11b, the operation of an engine cycle will now be described. Assuming the intake cycle occurs between adjacent vanes 34a and 34b in FIG. 11a, just after they revolve past the outer diameter ridge 24, the vanes travel through maximum intake volume between vanes 34c and 34d, reach peak compression between adjacent vanes 34i and 34j, wherein the vanes pass through minimum volume at protrusion 28a, followed by the combustion phase. As shown in FIG. 11b, the expansion phase commences at adjacent vanes 34o and 34p, thereafter passing through the maximum expansion volume at vanes 34q and 34r, prior to entering an exhaust port 57, which can be seen between vanes 34s and 34t, thereby completing one-half of a vane wheel revolution.

Similarly, as the vane wheel completes the second half of its revolution, a second complete engine cycle takes place, with intake occurring just after the vanes revolve past the inner diameter ridge 26, and exhaust occurring just prior to the vanes revolving past the outer diameter ridge 24.

The engine cycle is carried out in an essentially constant mass, or material volume, process. Such a process, as used here, refers to a process of compression, combustion, and expansion, in which, except for unintentional leakage or the possible injection of a hot ignition gas jet to maintain combustion, the mass within a region defined by any two adjacent vanes within the same helicotoroidal trough is constant. A non-constant mass process, as used here, would refer to a case where considerable mass is deliberately introduced into, and/or withdrawn from, a region between two adjacent vanes in the same trough. Such a non-constant mass condition might occur if air had to be forced through ports between vane volumes, such as between compression and expansion regions. By eliminating such porting between vane regions, this invention avoids the efficiency losses necessarily associated with pumping a fluid through a port or transfer passage.

With each revolution of the vane wheel, the trough casing would have also rotated a certain circumferential distance, in a direction perpendicular to the rotation of the vane wheel in the case of the illustrated embodiment, for example the distance A to B in FIG. 9. Between each pair of adjacent vane wheels, the number of complete engine cycles (EC) per trough casing revolution=(the number of vane wheel rotations for each trough path per rotor revolution (VR) times the number of toroidal stator protrusions (P) times the number of isolated, separate trough paths (T)):

$$EC=(VR)(P)(T) \quad (1)$$

The more vanes there are per vane wheel, the more isolated, separate trough paths there may be. For example, in the embodiment shown in FIG. 9, there are 3 rotations of each vane wheel per rotor rotation, 2 stator protrusions, 24 vanes per vane wheel, producing [3×2×24] or 144 complete engine cycles per trough casing revolution between each vane wheel pair.

The total number of engine cycles (TEC) per rotor revolution=(the number of engine cycles per trough casing revolution between each vane wheel pair (EC) times the number of vane wheels (NV)):

$$TEC=(EC)(NV) \quad (2)$$

Thus, in this embodiment, there is a total of [144×36] or 5184 complete engine cycles per trough casing revolution for all vane wheels. The illustrated embodiment displaces a total intake volume in one revolution which is approximately equal to the volume displaced by the entire engine assembly, thus achieving high power to weight and power to size ratios.

Again, it is the combination of the stator cross-sectional shape (for example, the protrusion cross-sectional shape discussed above), and the vane wheel alignment with respect to the stator protrusion, which produces a trapped volume of air with the rotor trough and stator, which varies in volume as the vane wheels rotate, and which produces compression and expansion cycles.

Figures 12A, 12B:
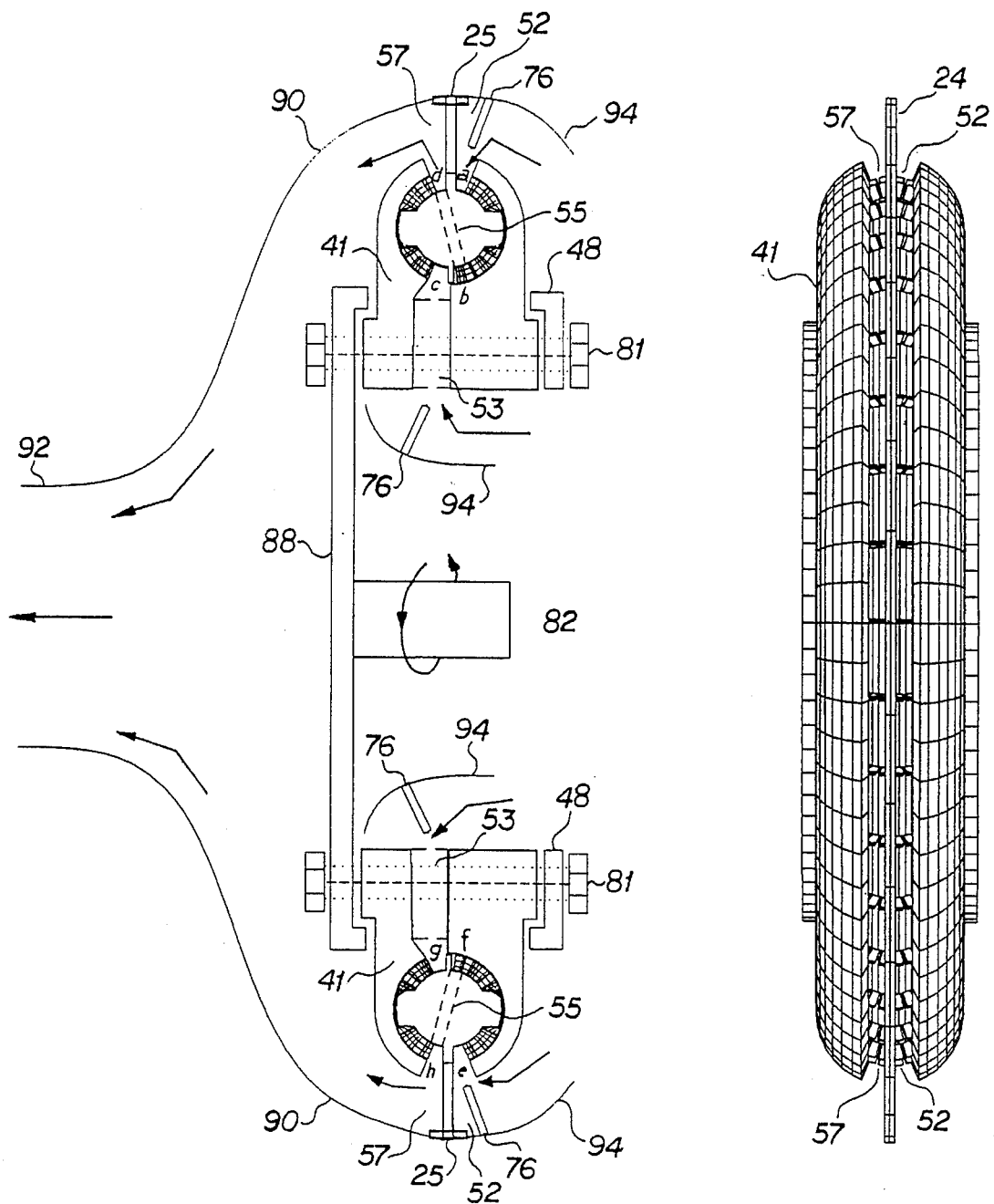
FIG. 12a is an end view of the helicotoroidal vane positive displacement turbine rotary engine.
FIG. 12b is a cross-section of the end view of the engine showing intake, exhaust, and transfer ports.

The intake and exhaust means of the engine comprises fixed open ports. FIGS. 12a and 12b illustrate, by way of example and not by limitation, a first continuous intake port 52 around the outer circumference of the rotor casing 41. As shown in FIGS. 1, 6, and 12b, a second series of discrete intake ports 53 may be integrally formed in the rotor casing. In addition, there exists a continuous exhaust port 57 around the outer circumference of rotor casing 41. Ports 52, 53, and 57 are placed to line up with the respective intake zone and the exhaust zones of the engine.

It is apparent that various designs and numbers of intake and exhaust ports may be utilized to correspond to the respective intake and exhaust zones of the engine. For example, as shown in FIG. 5, air may be ported through port 58 and passageway 59 in the stator ridge either as intake, exhaust, or both, though this arrangement increases the complexity of the engine.

As illustrated in FIG. 12b, the intake and exhaust phases can be segregated without the need of valves or extra mechanisms of any kind, and without the need for rotating seals.

Since there are two complete engine cycles per vane wheel revolution as discussed above, cross-over passages 55 (see FIGS. 9, 12b and 13) may be provided in the stator. Specifically, referring to FIG. 12b, one complete engine cycle commences with intake at 'a' and ends with exhaust at 'b'. A second complete engine cycle commences with intake at 'c' and ends with exhaust at 'd'. Similarly, complete engine cycles occur between 'e' and 'f', and 'g' and 'h'.

The exhaust at ports 'd' and 'h' exit directly to the exhaust shroud 90 and exhaust pipe 92, and thus pose no problem of exhaust gases exiting on the intake side of the engine. However, exhaust ported through 'b' or 'f', if allowed to exit at those locations, would cause intake and exhaust gas flow and mixing problems. Accordingly, exhaust cross-over passages 55 allow the exhaust air to exit the opposite side of the engine and flow out exhaust pipe 92.

As shown in FIG. 12b, the exhaust flow coming out of the rotating trough casing can be sealed off and directed to a fixed pipe 92, without having to use rotating seals, by having the power shaft 82 extend only through the front section of the engine where intake occurs. The fixed pipe 92 is then effectively sealed against the fixed raised outer ridge 25 around the circumference of the toroidal stator with exhaust shroud 90. This fixed pipe is the exhaust pipe of the engine and can be reduced to an appropriate diameter downstream of the engine, if needed, as shown in FIG. 12b.

A sealing plate 88, shown in FIG. 12b, separates the intake and exhaust regions. A ducted fan could also be utilized to create flow through the inner diameter rotor region, eliminating the need for the sealing plate, due to the high airflow velocities generated by the ducted fan, which would significantly prevent exhaust gases from mixing with intake gases. Such a ducted fan arrangement may be desirable for certain aircraft applications. Also, intake shrouds 94 can be used to facilitate flow around or through the engine, depending on the shape of the shroud.

The intake and exhaust regions are further illustrated in FIG. 14, which is a top diagrammatic view of a single trough 50 with the vanes 43, 44, and 45, on their respective vane wheels, disposed therein. The relative motion of the vanes is indicated by dashed arrow R. Vane 43 is represented as a dashed line to facilitate the view of the intake or exhaust area—depending on whether the stator ridge shown in FIG. 14 is the inner or outer diameter ridge 26 or 24. Assuming that FIG. 14 represents the intake port of the engine, it can be seen that each opening "u-v-w-x-u" can create a cross-sectional intake span on the order of the same width as the minimum trough cross section taken along line 37 of FIG. 14, which is always less than the average width of a vane due to the required positive helix angle. As the span of this opening "u-v-w-x-u" approaches the width of the minimum trough cross section, the open area through the intake port approaches the trough passage minimum cross-sectional area, thereby minimizing possible flow restriction through the intake port into the trough passage. Alternatively, the port could be constructed to permit the utilization of part or all of the area "x-w-y-x" for additional intake. However, the extra port area might increase the air drag on the engine. This same analysis would apply to the exhaust ports as well.

As deduced from FIG. 14, the intake volume that the engine displaces per revolution is approximately equal to the average minimum cross-sectional area between trough walls trapped between adjacent vanes 44 and 45 at maximum volume, multiplied by the number of complete cycles per vane during one vane wheel revolution, multiplied by the distance along the center line of one entire trough path around 360 degrees of trough casing rotation, multiplied by the number of separate troughs. This relationship shows that if the proper number of vane wheels are employed in the toroidal stator, the displaced volume per rotor revolution will approach the minimum cross-sectional area, as shown by line 37, of one exposed vane at the middle intake region multiplied by the length of an entire trough path around a full trough casing rotation multiplied by the number of separate paths, multiplied by the number of combustion protrusions. This means that a properly designed engine of this type could displace in one revolution a volume equal to or greater than the entire volume of the physical engine. The volumetric efficiency per revolution is important because increasing RPM only yields more power per weight and size to a point, namely where the sonic-order airflow velocity, or the rotor fiber stress, limits the maximum RPM.

The simplest fuel mixing system involves mixing the air and fuel upstream of the intake, with a carburetor or fuel injection device 76, as shown in FIG. 12*b*. In addition, vortex generators may be added upstream of the intake ports to further enhance mixing of air and fuel.

Alternatively, a fuel injection system could be added which would inject fuel either during the intake, compression, combustion, or expansion phase, or combinations thereof. In the embodiment shown in FIG. 13, for example, fuel enters through the outer diameter ridge 24 through fuel port 60. Fuel passageway 62 connects fuel port 60 with fuel outlet ports at each protrusion. The geometry of the fuel outlet port may comprise a single port 64, see FIG. 13, or a diagonally shaped slit or series of openings 64*c*, as shown in FIG. 15. By matching the path that the trough walls trace onto the stator protrusion, the openings 64*c* achieve the minimum necessary duration of the opening to each enclosed combustion chamber.

An advantage of the fuel injection system is that it permits higher compression ratios and entirely eliminates the possibility of the "convection vife" phenomenon observed with adiabatic walls in the failed ceramic turbine burners, whereby combustion fluctuations produced hot walls upstream of the desired point, which in turn produced hotter walls further upstream and combustion even further upstream. Though this invention does exhibit virtual adiabatic walls as with ceramic burners, it is believed that lean air-fuel mixtures combined with short residence times will prevent the flame from spreading from the walls into the rest of the volume and thus prevent the "convection vife" phenomenon from occurring in the first place, even with the desired premixed air/fuel mixture arrangement. It should be noted that the adiabatic walls should reduce thermal losses in this engine, by maintaining wall temperatures close to the local gas temperatures around the stator and rotor.

An ignition source may not be needed for the illustrated embodiment, at least for start-up. The high compression ratios will generate ignition at the low RPM associated with start-up, because of the high residence time and low turbulence velocity, despite the cool walls at start-up which tend to quench flames. As the engine warms up, RPM may be increased while maintaining reliable ignition from compression alone. If required, an ignition source 98, see FIG. 15, may be located at the stator protrusions, with any wiring piped through either stator ridge 24 or 26.

Figure 13:
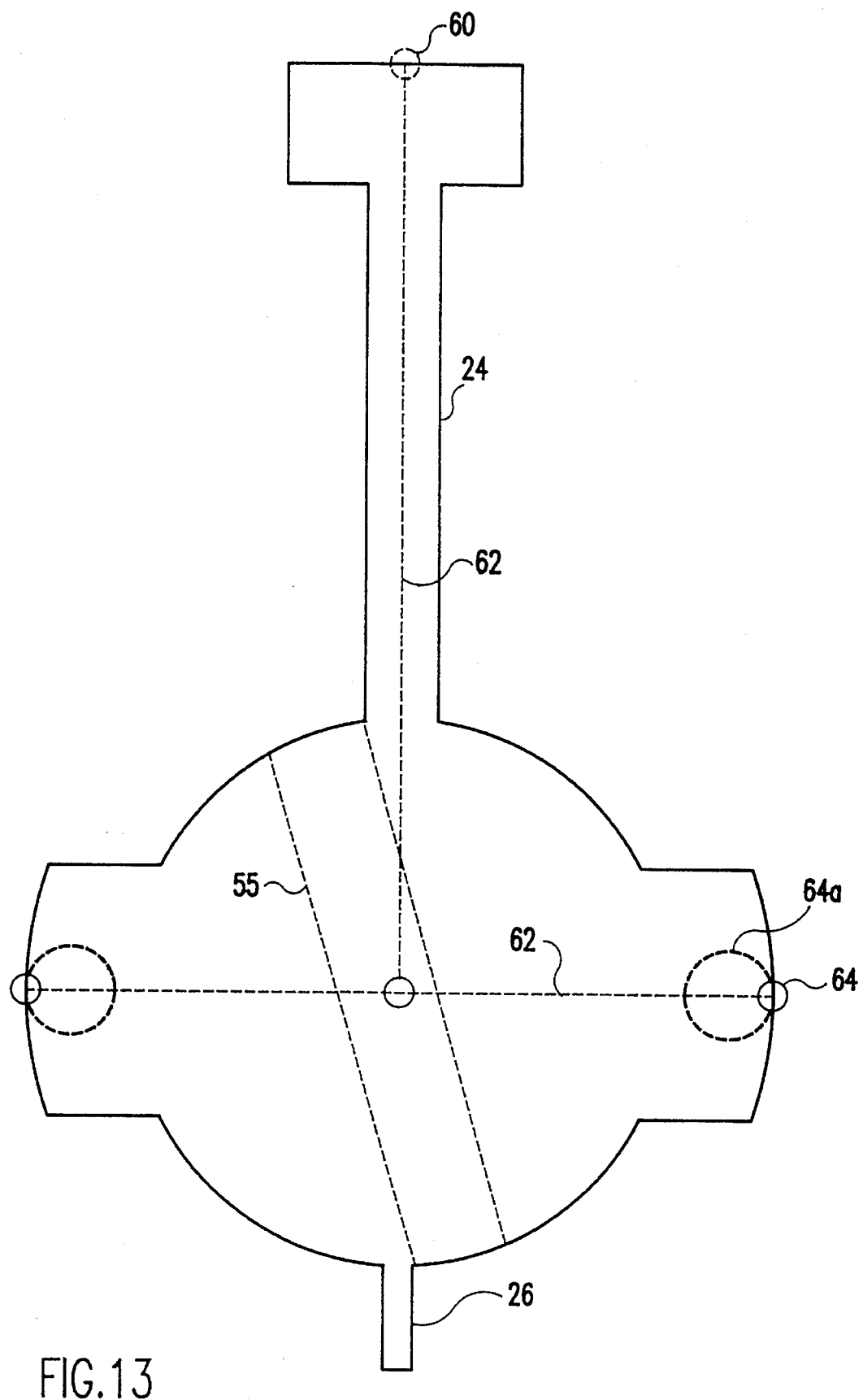
FIG. 13 is a front view of the stator segment of FIG. 5 with the fuel passages shown.

One way to maintain reliable ignition at various engine speeds and throttle settings, is to use combustion residence chambers 64*a*, as shown in FIG. 13, at the minimum volume regions. The combustion residence chambers 64*a* would retain hot combusted gases from a post-combusted volume and inject a jet of hot, high pressure gases into the subsequent precombustion volume to create ignition in this volume via auto-ignition or controlled flame spreading. This process would repeat itself when each subsequent volume between adjacent vane communicates with the combustion residence chamber 64*a*. The size, shape, and porting taps of the combustion residence chamber 64*a* would be arranged so as to contain enough combusted gas to maintain reliable ignition, while minimizing combusted gas residence time within the chamber to minimize NOx emissions. A catalyst material, such as a platinum coil, could be placed within the combustion residence chambers to further enhance ignition reliability and effectiveness.

Throttling of the engine's power levels may be achieved by several different methods such as conventional throttle vacuum generation, metering of the fuel quantity, or a combination thereof. Metering of the fuel quantity may be desirable because leaner mixtures should still auto-ignite, whereas the reduced compression pressures resulting from the throttled vacuum intake will require higher compression ratios to achieve the same auto-ignition as at full throttle. There may also be a slight efficiency advantage to eliminating the vacuum creation associated with traditional spark-ignition throttles.

At low power settings, however, ignition may become a problem with fuel metering or vacuum generation as the only throttling means, due to the lowered combustion temperatures and pressures. Furthermore, when using the fuel metering throttle means, exhaust gas temperatures may become too low to allow for catalytic converter operation, which may be desired to lower concentrations of certain pollutants in the exhaust gas flow.

A solution to both the ignition and exhaust gas temperature issues may be to provide a means for exhaust gas recirculation or heat exchange, into the intake flow. By incorporating a portion of exhaust gas heat in the intake flow, the peak temperatures and exhaust gas temperatures should remain high enough to support reliable ignition and catalytic converter operation. The engine may have a small efficiency loss due to increased intake temperatures, but this penalty should be offset by the mentioned gains. Furthermore, this engine's part-throttle efficiency, even with potential efficiency losses, should compare favorably to a piston or turbine engine's. The inherent mechanical losses of a piston engine become substantial at partial power settings, thereby greatly reducing efficiency, and turbine engines suffer significant efficiency losses at partial power settings.

A further advantage to exhaust gas recirculation might be the establishment of near-stoichiometric fuel/air ratios, even though the fuel/gas ratio would be quite lean. Put simply, the recirculated exhaust gas could volumetrically replace the excess oxygen/air not reacting with the fuel. This stoichiometric arrangement, which would eliminate excess oxygen, might be desirable for NOx catalytic reduction in the exhaust flow. If performed at other than small power settings, a means to control cooling of the exhaust gas before recirculation, such as a regulated air to air intercooler, could be provided to maintain acceptably low intake and combustion temperatures. Individually, or in combination, exhaust gas or exhaust gas heat recirculation, fuel-metering, and vacuum generation, can be utilized to optimize throttling of the engine.

As noted previously, the vane wheels 30 sit freely within each thin slit 27 (see FIGS. 9–10). The differential axial pressures on each vane (resulting from compression and expansion pressures) causes a net thrust force to be exerted in the direction opposite to the rotational direction of the rotor. If the thrust force is not balanced, the vane wheel 30 would contact one side of the thin slit 27, creating unwanted friction and associated heat. A ducting arrangement as shown in FIGS. 5 and 16 negates the thrust forces imposed on the vane wheels by balancing the fluid forces acting on the vanes of each vane wheel. This is achieved either by ducting air, through thrust passageway 72, from a high pressure region located at a certain azimuthal location around the outer surface of the stator, to a region on the side of the vane wheel facing the direction of fluid thrust forces through central opening 74, or by ducting air, through thrust passageway 72a, from a low pressure region located at a certain azimuthal location around the outer surface of the stator, to a region on the side of the vane wheel facing away from the direction of fluid thrust forces, through central opening 74, or by incorporating both such means. Each of the thrust passageways 72 and 72a can be incorporated within, or at the surface of, each stator segment 23 for each of the vane wheels in the stator. Thrust passageways 72 and 72a are displaced from and do not interact with the transfer ports 55, and can be located at pre-combustion, combustion, or post combustion-sites. This means for balancing thrust forces is applicable to compressors, pumps, engines, or internal combustion engines.

As shown in FIG. 16, an optional recessed area 70 may also be provided with the opening 74, whereby the high or low pressure air flows from the recess and impacts one face of the vane wheel 30. The size of the thrust passageways 72 and 72a would be selected to provide the requisite flow of air to counterbalance the thrust force.

With proper configuration of the thrust passageways and the gap spacing between stator walls and vane wheels, the pressures against the vane wheels will be self-compensating. For example, as a vane wheel approaches a high pressure slit wall on the stator, the air gap between the vane wheel and stator slit will be reduced, thereby increasing the high pressure against the vane wheel and preventing contact. As the vane wheel approaches a low pressure slit wall on the stator, the air gap between the vane wheel and high pressure slit wall will be enlarged, thereby reducing the high pressure against the vane wheel and preventing contact. The higher the pressure differentials between the entrance and exit of the thrust passageway, the greater the self-centering effect will be of the thrust bearing, but the greater the air flow losses will be through the thin slits 27. The optimum configuration would prevent all vane wheel contact while keeping to a minimum the airflow losses through the thin slits 27.

If necessary, conventional thrust bearing wedge-profiles could be incorporated into the faces of the vane wheel discs, stator segments, or both, to augment the self-compensating action of the ported vane wheel thrust bearing system described. These annularly corregated faces would generate elevated fluid pressures at close gaps between vane wheels and stator segment walls, thereby serving to reduce contact should a vane wheel approach a stator segment wall.

FIG. 17 shows a means for reducing the contact forces between the vanes 34 and trough walls by shaping the vane ends so as to create fluid-dynamic wedges which serve to center the vanes between the trough walls with minimal contact. The decreasing gap produces an air bearing. As the vanes approach the trough wall in one direction, all the vanes will create increased pressure against the trough walls in that direction due to this air bearing effect, thereby creating a self-centering effect. Though these air bearing forces are small, the forces which might force edge contact should be very slight. If it is found that a net rotational force results for some reason, a different contour could be formed on leading versus trailing vane edges, so as to counter this force.

It is apparent that certain of the invention features described above can be optimized depending on a variety of design considerations and the intended use of a particular engine configuration. As with any engine, the optimum design configuration represents a balancing of the relative advantages and disadvantages of-a particular parameter. The precise configuration will depend on one or more of the design parameters and constraints such as those discussed below.

Regarding the stator configuration, for example, two protrusions 28a and 28b are provided in FIG. 5 whose annular spread is such that at least six such protrusions could extend around the toroidal stator. The precise annular spread of each of the protrusions around the stator cross section depends on a number of factors, including the number of vane wheels, the helix angle $\alpha$, the number of vanes in each vane wheel, the dimensions of the engine, the annular spread of the intake and exhaust ports, the annular spread of the compression and exhaust chambers, the intake port overlap onto the compression region, and the exhaust port overlap onto the expansion region. An overriding consideration is that the annular protrusion spread should be large enough so that adjacent vanes within the same trough may both reside or be close to residing fully within the confines of the outer portion of the protrusion for some small duration, so that the maximum potential compression ratio may be achieved.

In the configuration illustrated in FIGS. 1 and 3, this outer protrusion annular spread works out to be approximately 40 degrees. The annular spread of the protrusion at its inner portion, that is, where it meets the stator, can be greater than the outer portion, so as to provide a gradual change in volume as the vanes revolve toward and away from the protrusion. Also, referring to FIG. 3, the angle of protrusion side 29a can be the same as, or different, from protrusion side 29b. Finally, the protrusions need not form a distinct break with the stator at any point, but may intersect with a gradual curve, or the stator may take the shape of an ellipse with the outer portions of the ellipse functioning as the protrusions. Any shape which, in conjunction with the vane slit alignment, produces a relative retraction of each vane wheel, will result in the desired effect. There may also be multiple effective protrusions or recesses within each engine cycle so as to desirably effect forces on the vanes or vary residence times at certain temperature domains to desirably effect, for example, exhaust pollution concentrations. The two protrusions of this embodiment, in addition to creating volume changes, serve to balance radial forces on the vane wheels.

Since volume changes in this multiple combustion embodiment do not result from conventional rotor diameter changes, but rather on the interaction of vanes, troughs, and the stator shape, the geometry of the troughs and vanes can also be varied to achieve particular design goals.

It can be seen that the higher the helix angle for a given engine specification, the greater the number of helicotoroidal trough channels, and thus the greater number of vane wheels needed to properly fill the trough channels for the requirements discussed above. For helix angles $\alpha$ below approximately 60 degrees (see 0 degree and 90 degree orientation in FIG. 9), power density generally increases with increasing helix angles though with diminishing gains; the high number of vanes wheels required for higher helix angles increases the complexity of the engine and also increases the vane volume to chamber volume ratio.

Since power density is inversely related to the toroidal stator cross-sectional diameter, large diameter engines should opt for minimal increases in the toroidal stator cross-sectional diameter and should install more vane wheels to fill the higher number of trough channels. Factors limiting the minimization of the toroidal stator cross-sectional diameter are small machining tolerances and complexity due to the higher number of vane wheels required.

The optimum configuration for a 300 mm outer diameter engine, for example, is not necessarily the same optimum configuration scalable to a 1000 mm outer diameter engine. The 1000 mm engine may incorporate a much smaller stator cross section as a percentage of the overall engine diameter than the 300 mm engine, thereby requiring a higher number of vane wheels in order to maintain the highest practical power density. Turbine engines have an analogous size/quantity progression, whereby the number of turbine blades generally increases with increasing size and power output.

Regarding the vane wheel characteristics, there should be enough vane wheels around the toroidal stator to 'fill-up' all these troughs with enough vanes, so that adjacent vanes within the same trough will approach full extension when at maximum volume. If the annular spread between adjacent vanes is too high compared to the helix angle of the troughs, then maximum volume will occur when one vane has only moved, for example, halfway out to maximum extension and the adjacent vane has moved halfway in from maximum extension.

The number of vane wheels 30 should be high enough to allow for proper intake and exhaust port durations, as well as proper peak compression duration at the outer protrusion region. Furthermore, there should be enough vane wheels to provide full intake and expansion regions around the stator.

Moreover, the width, length, and thickness of the vanes 34 can be varied, as can the vane gap between respective vanes 35, see FIGS. 7a and 8, around the vane wheel, and the number of vane wheels around the stator. For example, referring to FIGS. 5, 7b, and 10, the thickness of the vanes along the axial direction of the vane wheel 33, the percentage vane gap between respective vanes on a vane wheel 35, and the number of vane wheels 30, should be minimized so as to minimize the volume trapped within the vane gap region as the vane wheel revolves past a protrusion, so as to minimize leakage and compression losses due to these gap regions. The percentage gap should also be minimized as much as possible so as to improve power density.

However, the vane gap 35 between respective vanes on a vane wheel should be large enough so that, combined with the maximum helix angle, trough wall thicknesses result which are sufficient to provide proper strength and rigidity.

It is apparent that the number, width, and depth of the troughs would approximately correspond to the like number, width, and depth of the vanes on the vane wheel combined with the helix angle of the trough.

More engine cycles may be incorporated by including more protrusion/ridge pairs; however, this will greatly increase the number of vane wheels required for proper vane spread within each trough. As discussed above in reference to FIGS. 11a and 11b, the intake and exhaust phases for the engine occur just before or just after the adjacent vanes revolve past the ridges since the ridges would obstruct the air flow in the engine cycle anyway. The ridges thus serve to scavenge the exhaust flow and separate the intake from the exhaust regions. The ridge thickness should be kept as thin as possible, so as to increase available stator cross-sectional angular duration for the intake/compression/combustion/expansion/exhaust phases of the engine, thereby decreasing the total number of vane wheels required to provide the proper angular duration between adjacent vanes within the same trough. The porting for the engine becomes somewhat more complicated with increasing numbers of combustion sites per stator cross section.

In another embodiment, several engines can be linked end-to-end around a common shaft, if desired, and still have an arrangement where exhaust gases cannot escape the engine, even with rotating seal failure. To achieve this, a dividing wall separates the intake of one engine from the exhaust of the engine in front of it, sealing against the rotating casing shaft. A fixed pipe extends around and between all engines in line, connecting to each engine's toroidal stator ridge. Intake openings are placed on this pipe leading to each intake section, which is walled-off inside the pipe from the adjoining exhaust section. The exhaust sections are ducted through the fixed pipe. Though a rotating seal is used in the case of the dividing wall, it need not be a tight seal because it only seals against the power shaft, and this sealing arrangement means that any leakage will simply be slight exhaust gas recirculation into the intake of the adjacent engine, which can actually be desirable to further reduce NOx emissions. The leaking exhaust cannot escape to the outside of the fixed pipe, which from a safety standpoint is the issue of concern.

A further feature of this invention is that it can be effectively "geared" to varying ratios without sacrificing power density, by adjusting combinations of the many parameters. For instance, referencing the illustrated embodiment in FIG. 9, one could increase the number of vane wheel revolutions per rotor revolution from 3 to 8, increase the number of vane wheels from 36 to 96, and lower the rotor tangential speed to achieve approximately the same power output; the resulting power density would remain unchanged, but the rotor drive shaft RPM would be reduced to approximately 40% of the original speed. Thus, the designer has great flexibility with this design to tailor the engine's parameters to achieve the optimum operating speed set by the requirements of a particular installation. For example, an airplane engine driving a large propeller may require a much lower RPM than the same engine driving a small ducted fan. Both engine configurations could theoretically achieve the same horsepower with the same weight but with significantly different output RPM, all without the added weight, complexity, and cost of a gearbox.

It is the high frequency of engine cycles per second that permits such a high compression ratio to be used without generating pre-ignition, and it is the lean air-fuel ratio which prevents combustion temperatures from becoming so high (as a result of the high compression ratio) as to cause high emissions and material failure, and it is the combination of the high compression ratio and high frequency of engine cycling which allows such lean mixtures to ignite reliably. In contrast to a stoichiometric (chemically optimum) ratio of air to fuel, the lean mixture will significantly reduce power/weight and power/size ratios. However, the power to weight ratio is high enough so that even with a significant reduction due to lean air/fuel, the power to weight ratio can still conservatively exceed 5 HP/lb., compared to approximately 0.5 HP/lb for current piston engines, an improvement of 10 times in power density.

Regarding the temperature effects and corresponding materials utilized for the rotor, stator, and vane wheels, it is estimated that the peak temperature of the trough casing at the ignition points may reach the order of 1500 Celsius, a temperature which certain ceramic materials can handle. Portions of the toroidal stator at and near the stator protrusions may also reach this temperature. The vane wheels will see a uniform temperature caused by exposure to all parts of the cycle on the order of 1000 degrees Celsius. The temperature of the toroidal stator may need to be more uniformly distributed to help keep the rotor trough casing temperature within stress and/or strain limits (through radiant heat transfer). In the direct injection embodiment, the fuel that is pumped through the passageway 62, formed inside the toroidal stator, could cool the toroidal stator at the proper points and help to distribute the temperature evenly around the toroidal stator as the fuel is sprayed into the intake charge. The heat removed from the toroidal stator would not be a significant efficiency loss since the hot fuel would serve as reheat in the cycle. The cool toroidal stator would then radiantly cool the rotating trough casing since at such high temperatures, radiant heat exchange is highly effective over such short distances. The spinning vane wheels will also serve to distribute the temperature around the toroidal stator; since the vane wheels maintain a uniform temperature, they will cool the hot spots and heat the cool spots of the toroidal stator.

The temperature effects of combustion can be handled by the use of existing ceramic materials, either alone or in combination with the means discussed. For example, the vanes could be made from silicon-carbide, silicon-nitride, cubic boron nitride, or the like. The rotor, which requires great stiffness and strength in the trough walls, could be made from silicon carbide, silicon nitride, or the like. The stator, which does not require such stiffness, could be made from coated-graphite (to reduce weight), silicon carbide, silicon nitride, or the like.

Referring to FIG. 18, the numbers 0–10 represent the relative temperature gradient scale as seen in the engine, 10 being the highest. The numbers in this figure are for illustrative purposes and do not correspond to actual temperatures or temperature profiles. As shown, the temperature at the stator protrusions 28a and 28b are much higher than at the intake and exhaust locations 52, 53, and 57. The temperature gradually decreases as you move from the stator protrusions to the respective lower temperature regions. This temperature gradient will cause thermal stresses within the engine. If these thermal stresses are unacceptably high, there are several means which may reduce these stresses to acceptable levels.

One method for reducing this temperature gradient involves coating the rotor cavity 40 and stator 22, either in part or whole, with pyrolytic graphite 110. Pyrolytic graphite has high anisotropic thermal conductivity, on the order of 200 times higher conductivity along the "a" direction as along the "c" direction as shown in FIG. 19. This unique anisotropic property could effectively distribute the temperature evenly around the stator and rotor cross-sectional circumferences by the time the heat reaches the substrate material. By its nature, graphite is subject to oxidation at high temperatures, but a thin coating 120 of silicon carbon or zircon on top of the pyrolytic graphite will seal the pyrolytic graphite from the oxidative atmosphere, thereby eliminating the oxidation problem. The thermal coefficients of expansion for silicon carbide and zircon should be low enough to prevent thermal differential stresses from separating the coatings. Fortunately, the rubbing forces should be very light from vane to trough wall, thereby minimizing the likelihood of coating failure.

As a simpler means of lowering differential thermal stresses on the rotor than the coating process discussed above, one or more radial thermal expansion slots 96 may be provided in the rotor casing as shown in FIG. 20. Flow losses through the slits should be minimal, given the small gaps indicated. Also, external cooling means may be provided solely for the hottest portions, such as cooling fins on select rotor regions. The cooler portions of the rotor can also be insulated externally, further serving to reduce the differential temperatures of the rotor. Of course, the thermal stress-lowering means discussed above may be used alone or in combination as necessary.

A benefit of this design over the piston engine design is that the exposed cross-sectional area of the moving member (in this case the vane) decreases with decreasing volume. At peak combustion pressures, for instance, the exposed height of the vane is minimal, permitting the thin vane wheels to handle the high pressures of the combustion cycle.

If a vane wheel vane were to fracture within a trough, it would create a blockage at minimum volume, resulting in the almost immediate failure of all vane wheel vanes in this trough path as each vane impacted this blockage. The trough walls should be stronger than the vanes to maintain rotor integrity in the event of vane blockage. It is important to note that with this multi-path design, where distinct and complete paths are incorporated into the trough casings, the failure of all vanes in one trough path should not result in engine failure. This is an important safeguard. The vanes of other trough paths should maintain full integrity, while the fractured vanes in the failed path would offer virtually no resistance to the motion of the engine. Blockage in the path, though not catastrophic, would be serious, however, in that the vane wheels would no longer be balanced inertially and would create forces which could cause wear to the remaining vanes. However, for applications where operational integrity in such a situation is paramount, such as in aircraft engines, the fact that the engine would continue to operate at a significant power level for a long period of time with fractured and severed rotating members would be a major advantage to this design.

Though the engine comprises a number of vane wheels, assembly time is minimized because the vane wheels slip freely into their slits. A complete engine assembly would simply consist of mating the two trough casings around the stator, removing casing portion 43 from each rotor half at opposing locations, at the point shown in FIG. 20., and then alternately inserting each vane wheel through the open rotor section and spinning the rotor to align the next stator vane wheel slit until all vane wheels have been inserted. The casing portion 43 is then installed in each rotor half. It is readily apparent that multiple entry points could be used as well. A means for restraining each removable portion is provided, such as a retention ring 48 in FIG. 12b through which retention bolts 81 mount. The sealing plate 88 also functions as a retention ring.

It will be apparent to those skilled in the art that various modifications and variations can be made in the system and method of the present invention without departing from the spirit or scope of the invention. Thus, it is intended that the present invention cover the modifications and variations of this invention provided they come within the scope of the appended claims and their equivalents.

What is claimed is:

1. A helicotoroidal vane rotary engine comprising:
   a toroidal-shaped stator disposed around a central axis, the stator having a plurality of radially and axially extending, annularly-spaced thin slits defining a plurality of stator segments;
   a rotor disposed for rotation about the central axis, the rotor defining an annular cavity enclosing the stator and having a plurality of helicotoroidal troughs formed on the inner surface of the cavity;
   at least one means extending from the stator through at least one opening in the rotor for fixedly supporting and securing the stator;
   a planar vane wheel disposed in each thin slit for rotation about the wheel axis, each vane wheel having a plurality of annularly-spaced vanes radially extending into respective helicotoroidal troughs on the inner surface of the rotor cavity such that rotation of the rotor about the central axis imparts rotation to the vane wheels about their respective wheel axes, the vanes, helicotoroidal troughs, and stator cooperating to define a plurality of sequential, intake, compression, combustion, expansion, and exhaust chambers, as the rotor and vane wheels rotate about their respective axes;

intake and exhaust ports disposed to selectively communicate with the chambers; and a fuel system disposed to selectively communicate with the chambers.

2. The engine as in claim 1, further including at least one means for ducting air from an outer surface of one or more of said stator segments to a central opening in the stator segment, wherein the air communicates with the vane wheel such that the vane wheel is displaced from the stator segment, the air being of sufficient pressure to counter a thrust force on the vane wheel resulting from rotation of the rotor and the vane wheel.

3. The engine as in claim 1, wherein the stator segments include at least one radial protrusion.

4. The engine as in claim 1, wherein said rotor includes a plurality of openings around its circumference and said stator includes a plurality of supporting and securing means extending radially therefrom and extending through said openings in the rotor.

5. The engine as in claim 4, wherein said supporting and securing means are ridges, wherein at least one of said ridges provides structural integrity for the stator and a means to secure the stator externally.

6. The engine as in claim 5, further including a passageway in at least one of said ridges, whereby air is introduced in, or expelled from, the chambers.

7. The engine as in claim 1, wherein said rotor comprises two or more rotor casing portions, fixedly secured, and enclosing said stator.

8. The engine as in claim 1, wherein said fuel system includes a fuel passageway in each stator segment, the fuel passageway communicating with an external fuel source and a fuel outlet port at the stator surface such that fuel is introduced in the chambers.

9. The engine as in claim 8, wherein said fuel outlet port includes at least one opening formed in a line corresponding to the trough on the inner surface of the rotor.

10. The engine as in claim 1, wherein said fuel system includes a fuel outlet port communicating with the intake ports.

11. The engine as in claim 1, wherein the troughs define a helix angle on the inner surface of the rotor.

12. The engine as in claim 11, wherein said helix angle changes along a radial axis and said vanes are angled to communicate with the helix angle of the troughs.

13. The engine as in claim 1, wherein said vanes have tapered ends.

14. The engine as in claim 1, further including at least one transfer passageway in each stator segment communicating with the intake or exhaust ports and one or more of said chambers.

15. The engine as in claim 14, wherein said transfer passageway is shaped to correspond to the helicotoroidal path of the vane, thereby maximizing available port area.

16. The engine as in claim 1, wherein said vanes are made of at least one of the group consisting of silicon carbide, silicon nitride, or cubic boron nitride.

17. The engine as in claim 1, wherein at least one of said annular cavity or said stator are coated with at least one layer of a heat dispersing, anisotropic coating.

18. The engine as is claim 17, wherein said heat dispersing coating includes at least one or more of the group consisting of pyrolytic graphite or pyrolytic boron nitride.

19. The engine as in claim 18, wherein said heat dispersing coating is coated with at least one layer of an oxidation resistant coating.

20. The engine as in claim 19, wherein said oxidation resistant coating includes at least one of the group consisting of silicon carbide, zircon, or zirconia.

21. The engine as in claim 1, wherein the intake, compression, combustion, expansion, and exhaust chambers occur in a constant mass process.

22. The engine as in claim 1, further including at least one radial thermal expansion slit in said rotor.

23. A helicotoroidal vane rotary engine comprising:

a toroidal-shaped stator disposed around a central axis, the stator having a plurality of radially and axially extending, annularly-spaced thin slits defining a plurality of stator segments;

a rotor disposed for rotation about the central axis, the rotor defining an annular cavity enclosing the stator and having a plurality of helicotoroidal troughs formed on the inner surface of the cavity;

at least one means extending from the stator through at least one opening in the rotor for fixedly supporting and securing the stator;

a planar vane wheel disposed in each thin slit for rotation about the wheel axis, each vane wheel having a plurality of annularly-spaced vanes radially extending into respective helicotoroidal troughs on the inner surface of the rotor cavity such that rotation of the rotor about the central axis imparts rotation to the vane wheels about their respective wheel axes, the vanes helicotoroidal troughs, and stator cooperating to define at least one each of intake, compression, combustion, expansion and exhaust chambers occurring in a constant mass process as the rotor and vane wheels rotate about their respective axes;

intake and exhaust ports disposed to selectively communicate with the chambers; and a fuel system disposed to selectively communicate with the chambers.

24. A helicotoroidal vane rotary engine comprising:

a toroidal-shaped stator disposed around a central axis, the stator having a plurality of radially and axially extending, annularly-spaced thin slits defining a plurality of stator segment;

a rotor disposed for rotation about the central axis, the rotor defining an annular cavity enclosing the stator and having a plurality of helicotoroidal troughs formed on the inner surface of the cavity;

at least one means extending from the stator through at least one opening in the rotor for fixedly supporting and securing the stator;

a planar vane wheel disposed in each thin slit for rotation about the wheel axis, each vane wheel having a plurality of annularly-spaced vanes radially extending into respective helicotoroidal troughs on the inner surface of the rotor cavity such that rotation of the rotor about the central axis imparts rotation to the vane wheels about their respective wheel axes, the vanes, helicotoroidal troughs, and stator cooperating to define at least one each of intake, compression, combustion, expansion and exhaust chambers as the rotor and vane wheels rotate about their respective axes;

intake and exhaust ports disposed to selectively communicate with the chambers;

a fuel system disposed to selectively communicate with the chambers; and at least one means for ducting air from an outer surface of one or more of said stator segments to a central opening in the stator segment, wherein the air communicates with the vane wheel such that the vane wheel is displaced from the stator segment, the air being of sufficient pressure to counter a thrust force on the vane wheel resulting from rotation of the rotor and the vane wheel.

25. The engine as in claim 1, 23, or 24, further including an ignition means communicating with said engine.

26. The engine as in claim 25, wherein said ignition means includes a combustion residence chamber.

27. The engine as in claim 1, wherein the central and wheel axes are non-parallel.

28. A helicotoroidal vane rotary engine comprising:

a toroidal-shaped rotor disposed for rotation about a central axis, the rotor having a plurality of radially and axially extending, annularly-spaced thin slits;

a stator disposed around the central axis, the stator defining an annular cavity enclosing the rotor and having a plurality of helicotoroidal troughs formed on the inner surface of the cavity;

at least one power transferring means extending from the rotor through at least one opening in the stator;

a planar vane wheel disposed in each thin slit for rotation about the wheel axis, each vane wheel having a plurality of annularly-spaced vanes radially extending into respective helicotoroidal troughs on the inner surface of the stator cavity such that rotation of the rotor about the central axis imparts rotation to the vane wheels about their respective wheel axes, the vanes, helicotoroidal troughs, and rotor cooperating to define a plurality of sequential intake, compression, combustion, expansion and exhaust chambers as the rotor and vane wheels rotate about their respective axes;

intake and exhaust ports disposed to selectively communicate with the chambers; and a fuel system disposed to selectively communicate with the chambers.

29. A rotary machine comprising:

a toroidal-shaped stator disposed around a central axis, the stator having a plurality of radially and axially extending, annularly-spaced thin slits;

a rotor disposed for rotation about the central axis, the rotor defining an annular cavity enclosing the stator and having a plurality of helicotoroidal troughs formed on the inner surface of the cavity;

at least one means extending from the stator through at least one opening in the rotor for fixedly supporting and securing the stator;

a planar vane wheel disposed in each thin slit for rotation about the wheel axis, each vane wheel having a plurality of annularly-spaced vanes radially extending into respective helicotoroidal troughs on the inner surface of the rotor cavity such that rotation of the rotor about the central axis imparts rotation to the vane wheels about their respective wheel axes, the vanes, helicotoroidal troughs, and stator cooperating to define a plurality of sequential variable volume chambers as the rotor and vane wheels rotate about their respective axes;

ports disposed to selectively communicate with the chambers; and at least one means for ducting air from an outer surface of one or more of said stator segments to a central opening in the stator segment, wherein the air communicates with the vane wheel such that the vane wheel is displaced from the stator segment, the air being of sufficient pressure to counter a thrust force on the vane wheel resulting from rotation of the rotor and the vane wheel.

30. The engine as in claim 10, wherein exhaust gases from the exhaust ports communicate with the intake ports.

\* \* \* \* \*